United States Patent [19]

Kamiya et al.

[11] Patent Number: 5,917,435
[45] Date of Patent: Jun. 29, 1999

[54] NAVIGATION APPARATUS FOR VEHICLES

[75] Inventors: Kazuo Kamiya, Aichi-ken; Shoji Yokoyama, Tokyo; Hironari Fukatsu; Tatsumi Muramatsu, both of Aichi-ken, all of Japan

[73] Assignee: Aisin AW Co., Ltd., Anjo, Japan

[21] Appl. No.: 08/618,353

[22] Filed: Mar. 19, 1996

[30] Foreign Application Priority Data

Mar. 20, 1995 [JP] Japan .................................. 7-087505
Mar. 15, 1996 [JP] Japan .................................. 8-087317

[51] Int. Cl.[6] .................................................. G08G 1/123
[52] U.S. Cl. ........................................... 340/995; 340/988
[58] Field of Search .................................... 340/995, 990, 340/461, 971, 980, 973, 988; 361/681, 682, 683; 248/923; 701/208, 207, 213

[56] References Cited

U.S. PATENT DOCUMENTS

| | | | |
|---|---|---|---|
| 4,504,910 | 3/1985 | Araki et al. .................. | 340/995 |
| 4,679,026 | 7/1987 | Khakowski et al. .......... | 340/568 |
| 4,983,951 | 1/1991 | Igarashi et al. ............... | 340/995 |
| 4,988,995 | 1/1991 | Butsson et al. ............... | 340/971 |
| 5,467,085 | 11/1995 | Dunn ............................. | 340/971 |
| 5,555,491 | 9/1996 | Tao ............................... | 361/683 |
| 5,568,390 | 10/1996 | Hirota et al. .................. | 340/995 |
| 5,642,107 | 6/1997 | Cross ............................ | 340/995 |

FOREIGN PATENT DOCUMENTS

| | | |
|---|---|---|
| 42 04 164 | 8/1993 | Germany . |
| 43 12 583 | 11/1994 | Germany . |
| 6-72252 | 3/1994 | Japan . |
| WO 95/05686 | 2/1995 | WIPO . |

*Primary Examiner*—Brent A. Swarthout
*Attorney, Agent, or Firm*—Oblon, Spivak, McClelland, Maier & Neustadt, P.C.

[57] ABSTRACT

A navigation apparatus for vehicles which comprises a GPS receiver connected to a GPS antenna, a gyro sensor, a vehicle signal processing circuit for processing vehicle signals such as a vehicle speed signal, a CD unit for driving a CD-ROM containing map information, a display unit for displaying a map, and an ECU for controlling the entire operation, wherein at least the CD unit, the display unit and the ECU are disposed within a detachable unit which can be detachably installed in a vehicle.

18 Claims, 30 Drawing Sheets

(A)

(B)

(A)

(B)

(A)

(B)

NAVIGATION APPARATUS FOR VEHICLES

BACKGROUND OF THE INVENTION

1. Field of the Invention

The present invention relates to a navigation apparatus for vehicles which includes a function called a global positioning system (hereinafter referred to as a GPS) for determining the present position based on signals from satellites, and a function of searching and displaying map information in an optical disk for data storage (hereinafter referred to as a CD-ROM).

2. Description of the Prior Art

In a first conventional navigation apparatus for vehicles, as shown in FIG. 30, the main body of the navigation apparatus for vehicles consists of a GPS receiver R connected to a GPS antenna A, a CD unit CD for driving a CD-ROM containing map information, a display unit D for displaying a map, and an ECU for controlling the entire operation. When used in a car, the main body is mounted to a proper position within the interior of the car. When used outside the car, the main body is removed from the mounted position and is carried outside for use.

In a second conventional navigation apparatus for vehicles, as shown in FIG. 31, the main body of the navigation apparatus for vehicles consists of a GPS receiver R connected to a GPS antenna A, a gyro sensor J, a CD unit CD for driving a CD-ROM containing map information, a display unit D for displaying a map, and an ECU for controlling the entire operation, and is undetachably mounted to a proper position within the interior of a car.

In a third conventional navigation apparatus for vehicles (Japanese Patent Application Laid-Open (kokai) No. 7-14095), as shown in FIG. 32, the main body H of the navigation apparatus for vehicles, which includes a GPS receiver connected to a GPS antenna, a CD unit for driving a CD-ROM containing map information, a display unit D for displaying a map and an ECU for controlling the entire operation, is mounted on a stand S which sits upright on the floor of a car. In such a state, basic operations such as navigation, display of the current position, enlargement/reduction of a map, and writing a mark can be performed. However, when a route is preset so as to display an optimal route, the main body H of the navigation apparatus for vehicles must be removed from the stand S.

Since the first conventional navigation apparatus for vehicles neither includes a gyro within the apparatus, nor utilizes the traveling information of a vehicle, this apparatus has a problem of producing error in the current position.

Since the second conventional navigation apparatus for vehicles includes the gyro sensor J, error in the current position is hardly produced. However, this apparatus has the problems that the position and inclination of the apparatus must be maintained constant, and that the apparatus has an increased overall size and therefore is undetachably installed in the vehicle, thereby making it impossible to carry it.

Further, the third conventional navigation apparatus for vehicles has the problem that the setting of a route for displaying an optimal route cannot be performed unless the main body H of the navigation apparatus for vehicles is removed from the stand S.

SUMMARY OF THE INVENTION

It is a general object of the present invention to provide a navigation apparatus for vehicles with which it is possible to perform drive simulation, listen to music, watch movies and the like outside the vehicle.

It is a more specific object of the present invention to provide a navigation apparatus for vehicles which it is possible to install the detachable unit into a console of the vehicle so as to increase the accuracy of navigation.

It is another object of the present invention to provide a navigation apparatus for vehicles based on the technical idea for disposing at least a CD unit, a display unit and an ECU within a detachable unit which can be detachably installed in a vehicle.

It is a still another object of the present invention to provide a navigation apparatus for vehicles comprising a GPS receiver connected to a GPS antenna, a gyro sensor, a vehicle signal processing circuit for processing vehicle signals such as a vehicle speed signal, a CD unit for driving a CD-ROM containing map information, a display unit for displaying a map, and an ECU for controlling the entire operation.

It is a further object of the present invention to provide a navigation apparatus for vehicles according to the first aspect which comprises a GPS receiver connected to a GPS antenna, a gyro sensor, a vehicle signal processing circuit for processing vehicle signals such as a vehicle speed signal, a CD unit for driving a CD-ROM containing map information, a display unit for displaying a map, and an ECU for controlling the entire operation, wherein at least the CD unit, the display unit and the ECU are disposed within a detachable unit which can be detachably installed in a vehicle.

It is a still further object of the present invention to provide a navigation apparatus for vehicles according to the second aspect which further comprises a power supply circuit disposed within the detachable unit.

It is another object of the present invention to provide a navigation apparatus for vehicles according to the third aspect wherein the detachable unit is installed into a unit space within a console of the vehicle.

It is a further object of the present invention to provide a navigation apparatus for vehicles according to the fourth aspect wherein the CD unit is disposed in the detachable unit such that the CD unit is allowed to project from the detachable unit.

It is a still further object of the present invention to provide a navigation apparatus for vehicles according to the fifth aspect wherein the display unit is disposed in the detachable unit such that the display unit is allowed to project from the detachable unit and in that the projected display unit is swung such that a display portion thereof located on the front face faces a driver.

It is a yet further object of the present invention to provide a navigation apparatus for vehicles according to the sixth aspect which further comprises an auxiliary unit comprising an AC 100 V connector, a cigarette lighter connector, a battery, an amplifier, and a speaker so as to enable use of the detachable unit outside the vehicle.

It is a still further object of the present invention to provide a navigation apparatus for vehicles according to the seventh aspect which further comprises one connector element of a connector, which is connected to the CD unit, the display unit and the ECU, disposed on a rear portion of the detachable unit, and in which the other connector element of the connector is disposed on a vehicle body-side portion facing the rear portion of the detachable unit, whereby when the detachable unit is installed into a unit space within a console of the vehicle, the connector elements are connected with each other.

It is a yet further object of the present invention to provide a navigation apparatus for vehicles according to the eighth aspect which further comprises a detection switch which comprises a detection switch portion which is disposed on a vehicle body-side portion facing the rear portion of the detachable unit, and a contact member which is disposed on the rear portion of the detachable unit at a portion facing the detection switch portion, whereby the detection switch portion and the contact member separate from each other before the connector elements separate from each other, when the detachable unit installed into the unit space within the console of the vehicle is removed therefrom.

It is a yet further object of the present invention to provide a navigation apparatus for vehicles according to the ninth aspect which further comprises one of the engagement members for engaging the detachable unit with a vehicle body disposed on a rear portion of the detachable unit, and the other of the engagement members is disposed on a vehicle body-side portion facing the rear portion of the detachable unit, whereby when the detachable unit is installed into a unit space within a console of the vehicle, the engagement members engage with each other so as to lock the detachable unit to the vehicle body.

It is another object of the present invention to provide a navigation apparatus for vehicles according to the tenth aspect which further comprises an unlock mechanism comprising a rod whose one end is connected to the one engagement member disposed on the rear portion of the detachable unit and which is biased by a spring, a link whose one end is swingably connected to the other end of the rod, and a lever whose one end is connected to the other end of the link and is swingable about a fulcrum, whereby the engagement between the engagement members which lock the detachable unit to the vehicle body can be broken so as to unlock the detachable unit.

It is a further object of the present invention to provide a navigation apparatus for vehicles according to the eleventh aspect which further comprises an elastic holding mechanism which comprises a spring member disposed on a vehicle body-side sidewall portion facing the rear portion of the detachable unit, whereby when the engagement members are caused to engage with each other so as to lock the detachable unit to the vehicle body, the spring member is pressed by the rear portion of the detachable unit and is elastically deformed, so that the detachable unit is elastically held by the spring member.

It is a yet further object of the present invention to provide a navigation apparatus for vehicles according to the twelfth aspect which further comprises a display positioning mechanism which comprises an engagement member disposed on a side wall thereof and biased by a spring to swing, and a plurality of engagement portions which are arranged on an inner side wall of the console of the vehicle facing the side wall of the display unit in the direction of movement of the display unit, whereby the display unit is positioned at any one of a plurality of projected positions by changing the relationship of engagement between the engagement member and the plurality of engagement portions.

It is a yet further object of the present invention to provide a navigation apparatus for vehicles according to the thirteenth aspect which further comprises a detection switch comprising a detection switch portion which is disposed on a vehicle body-side portion facing the rear portion of the detachable unit, and a contact member which is disposed on one end of the rod at the rear portion of the detachable unit, the one end of the rod facing the detection switch portion, whereby when the lever is swung to an unlock position, the rod is moved so as to separate the detection switch portion and the contact member.

The navigation apparatus for vehicles according to the first aspect of the present invention having the above-described structure, which comprises a GPS receiver connected to a GPS antenna, a gyro sensor, a vehicle signal processing circuit for processing vehicle signals such as a vehicle speed signal, a CD unit for driving a CD-ROM containing map information, a display unit for displaying a map, and an ECU for controlling the entire operation, functions as a navigation apparatus for vehicles which can perform navigation based on outputs from the GPS and the gyro sensor. In addition, the apparatus can be used outside the vehicle by removing the detachable unit including at least the CD unit, the display unit and the ECU from the vehicle.

In the navigation apparatus for vehicles according to the second aspect of the present invention having the above-described structure, the CD unit, the display unit and the ECU are driven by the power supply circuit disposed within the detachable unit.

In the navigation apparatus for vehicles according to the third aspect of the present invention having the above-described structure, the detachable unit including the CD unit, the display unit and the ECU is installed into the unit space within the console of the vehicle.

In the navigation apparatus for vehicles according to the fourth aspect of the present invention having the above-described structure, since the CD unit is disposed in the detachable unit such that the CD unit is allowed to project from the detachable unit, the CD unit is projected when the CD-ROM is loaded or unloaded.

In the navigation apparatus for vehicles according to the fifth aspect of the present invention having the above-described structure, when the display unit is used, the display unit is projected from the detachable unit so as to bring it into a projected state, and is swung such that the display portion thereof located on the front face faces a driver.

In the navigation apparatus for vehicles according to the sixth aspect of the present invention having the above-described structure, for use outside a vehicle, the AC 100 V connector or the cigarette lighter connector is connected to an AC 100 V connector or a cigarette lighter, whereby the auxiliary unit including the battery, the amplifier and the speaker drives the CD unit, the display unit and the ECU within the detachable unit, and sound is output directly from the speaker.

In the navigation apparatus for vehicles according to the seventh aspect of the present invention having the above-described structure, when the detachable unit is installed into the unit space within the console of the vehicle, one connector element of the connector, which is disposed on the rear portion of the detachable unit and is connected to the CD unit, the display unit and the ECU, is connected to the other connector element of the connector which is disposed on a vehicle body-side portion facing the rear portion of the detachable unit.

In the navigation apparatus for vehicles according to the eighth aspect of the present invention having the above-described structure, when the detachable unit is removed from the unit space within the console of the vehicle, the detection switch portion of the detection switch disposed on the vehicle body-side portion facing the rear portion of the detachable unit separates from the contact member disposed on the rear portion of the detachable unit before the connector elements separate from each other.

In the navigation apparatus for vehicles according to the ninth aspect of the present invention having the above-described structure, when the detachable unit is installed into the unit space within the console of the vehicle, one of the engagement members for engaging the detachable unit with the vehicle body which is disposed on the rear portion of the detachable unit is engaged with the other of the engagement members which is disposed on the vehicle body-side portion facing the rear portion of the detachable unit, whereby the detachable unit is locked to the vehicle body.

In the navigation apparatus for vehicles according to the tenth aspect of the present invention having the above-described structure, when the lever is swung about the fulcrum, the link of the unlock mechanism swings, whose other end is connected to one end of the lever and whose one end is swingably connected to the other end of the rod. As a result, the rod biased by the spring is moved so as to control the relationship of engagement between the one of the engagement members, to which one end of the rod is connected and which is disposed on the rear portion of the detachable unit, and the other of the engagement members, which is disposed on the vehicle body-side portion.

In the navigation apparatus for vehicles according to the eleventh aspect of the present invention having the above-described structure, when the engagement members are caused to engage with each other so as to lock the detachable unit to the vehicle body, the rear portion of the detachable unit presses the spring member of the elastic holding mechanism, which is disposed on the body-side sidewall portion facing the rear portion of the detachable unit, so that the spring member of the elastic holing mechanism is elastically deformed so as to elastically hold the detachable unit.

In the navigation apparatus for vehicles according to the twelfth aspect of the present invention having the above-described structure, the display unit projectably disposed in the detachable unit is provided with the engagement member which is disposed on a side wall of the display unit and is biased by the spring to swing, and the plurality of engagement portions which are arranged on an inner side wall of the console of the vehicle facing the side wall of the display unit in the direction of movement of the display unit. Therefore, the display unit can be positioned at any one of the plurality of projected positions by changing the relationship of engagement between the engagement member and the plurality of engagement portions which constitute the display positioning mechanism.

In the navigation apparatus for vehicles according to the thirteenth aspect of the present invention having the above-described structure, when the lever is swung to the unlock position, the rod moves, so that the detection switch portion disposed on the vehicle body-side portion facing the rear portion of the detachable unit separates from the contact member disposed on one end of the rod at the rear portion of the detachable unit, which one end of the rod faces the detection switch portion.

In the navigation apparatus for vehicles according to the first aspect of the present invention providing the above-described action, there is provided the effect of making it possible to perform navigation based on outputs from the GPS and the gyro sensor. In addition, since use of the apparatus outside a vehicle can be realized by removing from the vehicle the detachable unit including at least the CD unit, the display unit, and the ECU, it is possible to perform drive simulation, listen to music, watch movies and the like outside the vehicle, and also to install the detachable unit into the console of the vehicle so as to increase the accuracy of navigation.

In the navigation apparatus for vehicles according to the second aspect of the present invention providing the above-described action, since the power supply circuit provided in the detachable unit adjusts the voltage to a level required to drive the CD unit, the display unit and the ECU, there is provided the effect of making it possible to use the apparatus by only connecting it to a battery or commercial power, in addition to the effects provided by the first invention.

In the navigation apparatus for vehicles according to the third aspect of the present invention providing the above-described action, since the detachable unit including the CD unit, the display unit and the ECU is installed into the unit space within the console of the vehicle, there are provided the effects of improving the appearance and eliminating obstructions, in addition to the effects provided by the first invention.

In the navigation apparatus for vehicles according to the fourth aspect of the present invention providing the above-described action, since the CD unit is projected when the CD-ROM is loaded or unloaded, there is provided the effect of facilitating the loading/unloading of the CD-ROM.

In the navigation apparatus for vehicles according to the fifth aspect of the present invention providing the above-described action, when the display unit is used, the display unit is projected from the detachable unit so as to bring it into a projected state, and is swung such that the display portion thereof located on the front face faces a driver. Accordingly, there is provided the effects that the display portion of the display unit can be easily viewed when being used, and that the display unit does not become a hindrance when not being used, as it is retracted into the detachable unit.

In the navigation apparatus for vehicles according to the sixth aspect of the present invention providing the above-described action, when being used outside the vehicle, the auxiliary unit including the battery, the amplifier and the speaker drives the CD unit, the display unit and the ECU within the detachable unit, and sound is output directly from the speaker. Accordingly, there is provided the effect of facilitating use outside the vehicle in a reliable manner.

In the navigation apparatus for vehicles according to the seventh aspect of the present invention providing the above-described action, when the detachable unit is installed into the unit space within the console of the vehicle, one connector element of the connector, which is disposed on the rear portion of the detachable unit and is connected to the CD unit, the display unit and the ECU, is connected to the other connector element of the connector, which is disposed on the vehicle body-side portion. Accordingly, there is provided the effect of making it possible to supply electrical power and to input and output signals.

In the navigation apparatus for vehicles according to the eighth aspect of the present invention providing the above-described action, when the detachable unit is removed from the unit space within the console of the vehicle, the detection switch portion of the detection switch disposed on the vehicle body-side portion separates from the contact member disposed on the rear portion of the detachable unit before the connector elements separate from each other. Accordingly, there is provided the effect of preventing the detachable unit from being attached or detached in a state in which electrical power is being supplied.

In the navigation apparatus for vehicles according to the ninth aspect of the present invention providing the above-described action, when the detachable unit is installed into the unit space within the console of the vehicle, one engagement member of the engagement mechanism which is disposed on the rear portion of the detachable unit is engaged with the other engagement member of the engagement mechanism which is disposed on the vehicle body-side portion, whereby the detachable unit is locked to the vehicle body. Accordingly, there is provided the effect of preventing the detachable unit from coming out of the console of the vehicle.

In the navigation apparatus for vehicles according to the tenth aspect of the present invention providing the above-described action, when the lever of the unlock mechanism is swung about the fulcrum, the link swings so as to move the rod, thereby controlling the relationship of engagement between the one engagement member, to which one end of the rod is connected and which is disposed on the rear portion of the detachable unit, and the other engagement member which is disposed on the vehicle body-side portion, thereby breaking the locked state of the detachable unit. Accordingly, there is provided the effect of making it possible to remove the detachable unit from the console of the vehicle.

In the navigation apparatus for vehicles according to the eleventh aspect of the present invention providing the above-described action, when the engagement members are caused to engage with each other so as to lock the detachable unit to the vehicle body, the rear portion of the detachable unit presses the spring member of the elastic holding mechanism which is disposed on the body-side sidewall portion, so that the spring member is elastically deformed so as to elastically hold the detachable unit. Accordingly, there is provided the effect of preventing the detachable unit from rattling which would otherwise occur due to vibration of the vehicle.

In the navigation apparatus for vehicles according to the twelfth aspect of the present invention providing the above-described action, the engagement member is disposed on the side wall of the display unit and is biased to swing by the spring of the display positioning mechanism, and the plurality of engagement portions are arranged on the inner side wall of the console of the vehicle facing the side wall of the display unit in the direction of movement of the display unit. Accordingly, there is the effect of making it possible to position the display unit at a desired position among the plurality of projected positions by changing the relationship of engagement between the engagement member and a plurality of engagement portions of the display positioning mechanism.

In the navigation apparatus for vehicles according to the thirteenth aspect of the present invention providing the above-described action, when the lever is swung to the unlock position, the rod moves, so that the contact member separates from the detection switch portion. Accordingly, there is the effect of making it possible to turn off the detection switch in response to the unlock operation of the unlock mechanism, and also to prevent the detachable unit from being attached or detached in a state in which electrical power is being supplied.

DETAILED DESCRIPTION OF PREFERRED EMBODIMENTS

Embodiments of the present invention will now be described with reference to the drawings.

(First Preferred Embodiment)

Figure 1:
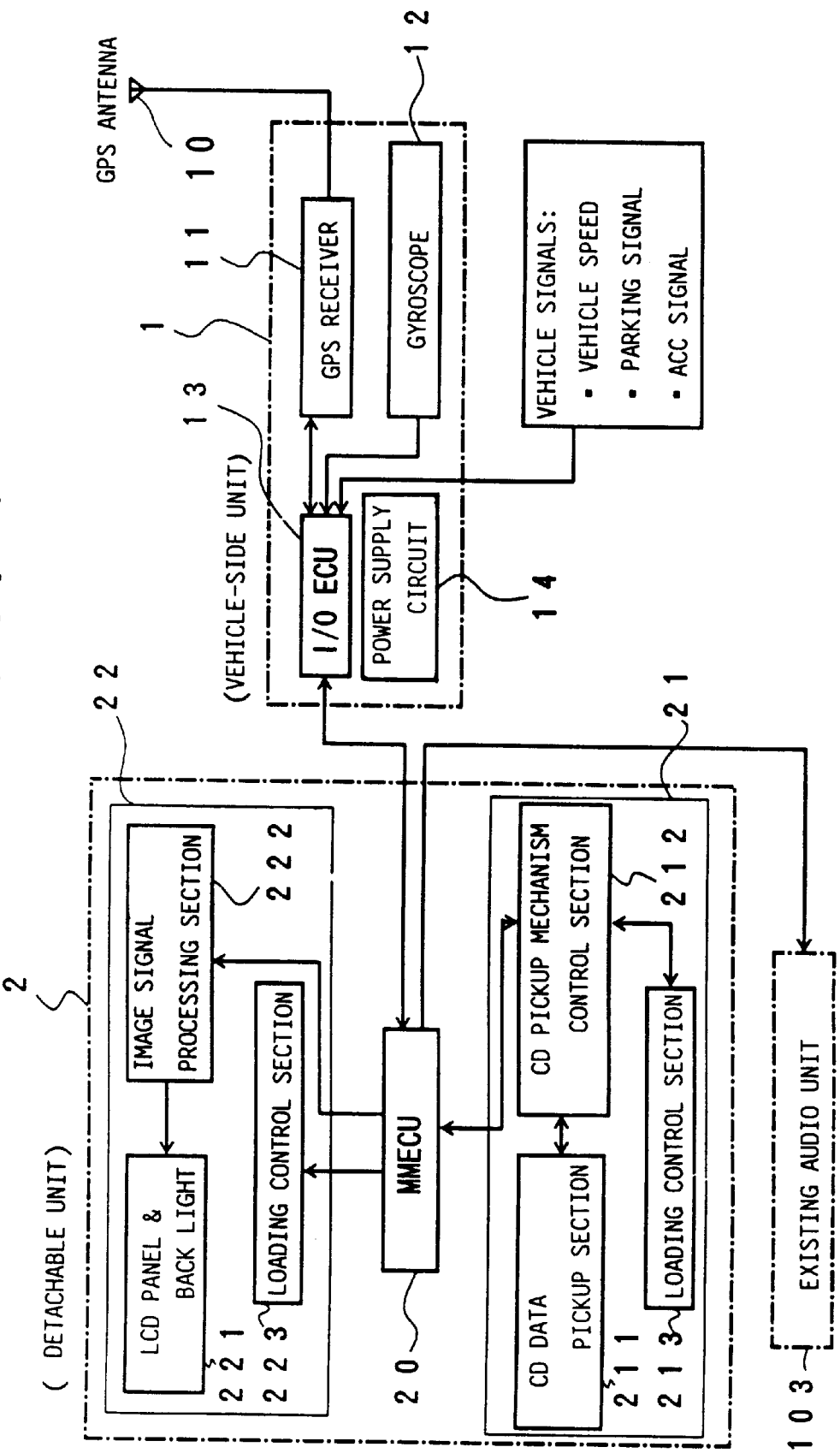
FIG. 1 is a block diagram showing an apparatus according to a first preferred embodiment of the present invention.
Figure 12:
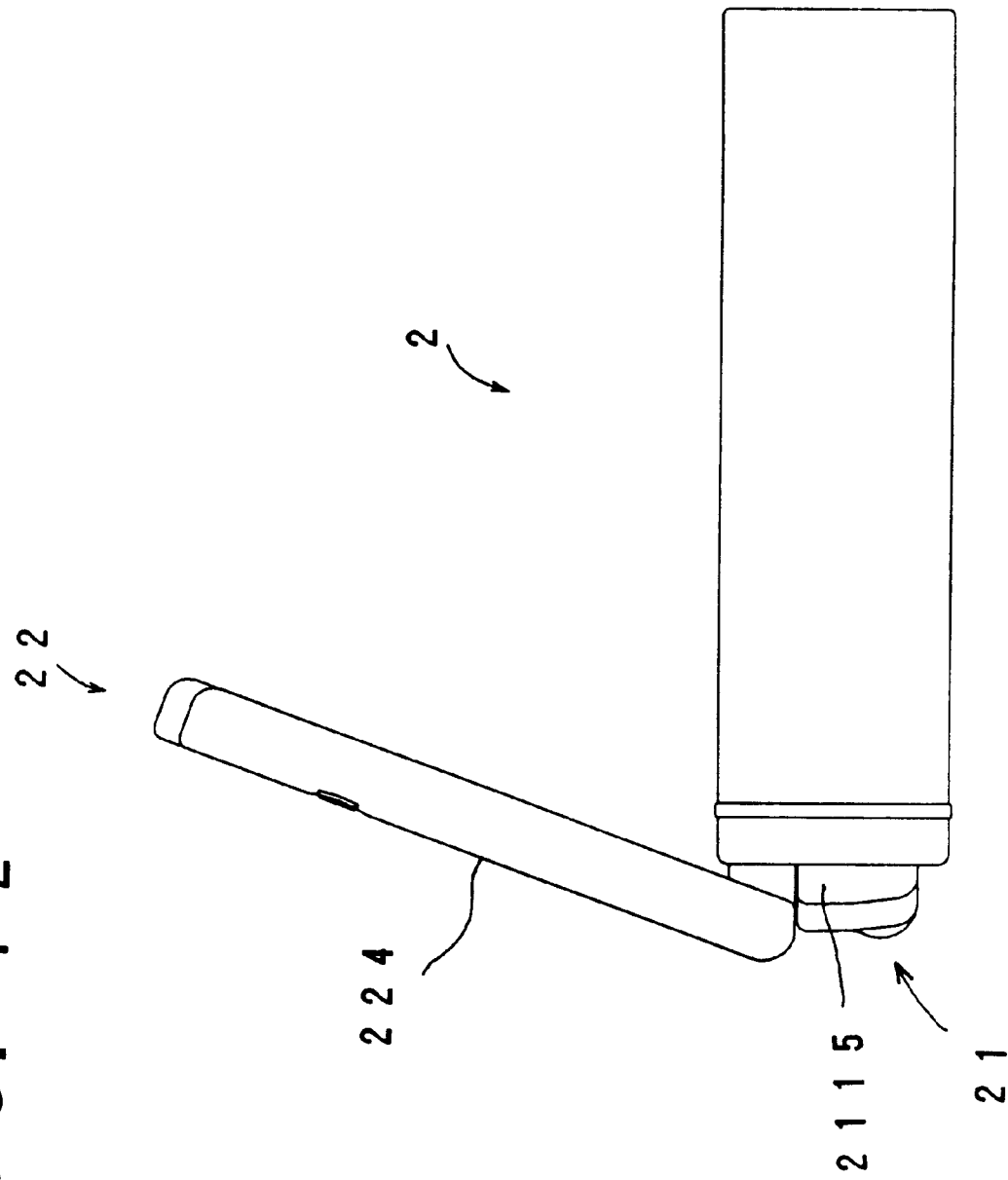
FIG. 12 is a side view showing a state in which the liquid crystal display of the first preferred embodiment is in use.

A navigation apparatus for vehicles of a first preferred embodiment consists of a vehicle-side unit 1, and a detachable unit 2, as shown in FIG. 1 and FIG. 12. The vehicle-side unit 1 includes a GPS receiver 11, a gyroscope 12, an I/O ECU 13 serving as a vehicle signal processing circuit for processing vehicle signals such as a vehicle speed signal, and a power supply circuit 14. The detachable unit 2 includes a CD unit 21 for driving a CD-ROM containing map information, a liquid display 22 for displaying a map, and an MMECU 20 for controlling the entire operation.

Figure 2:
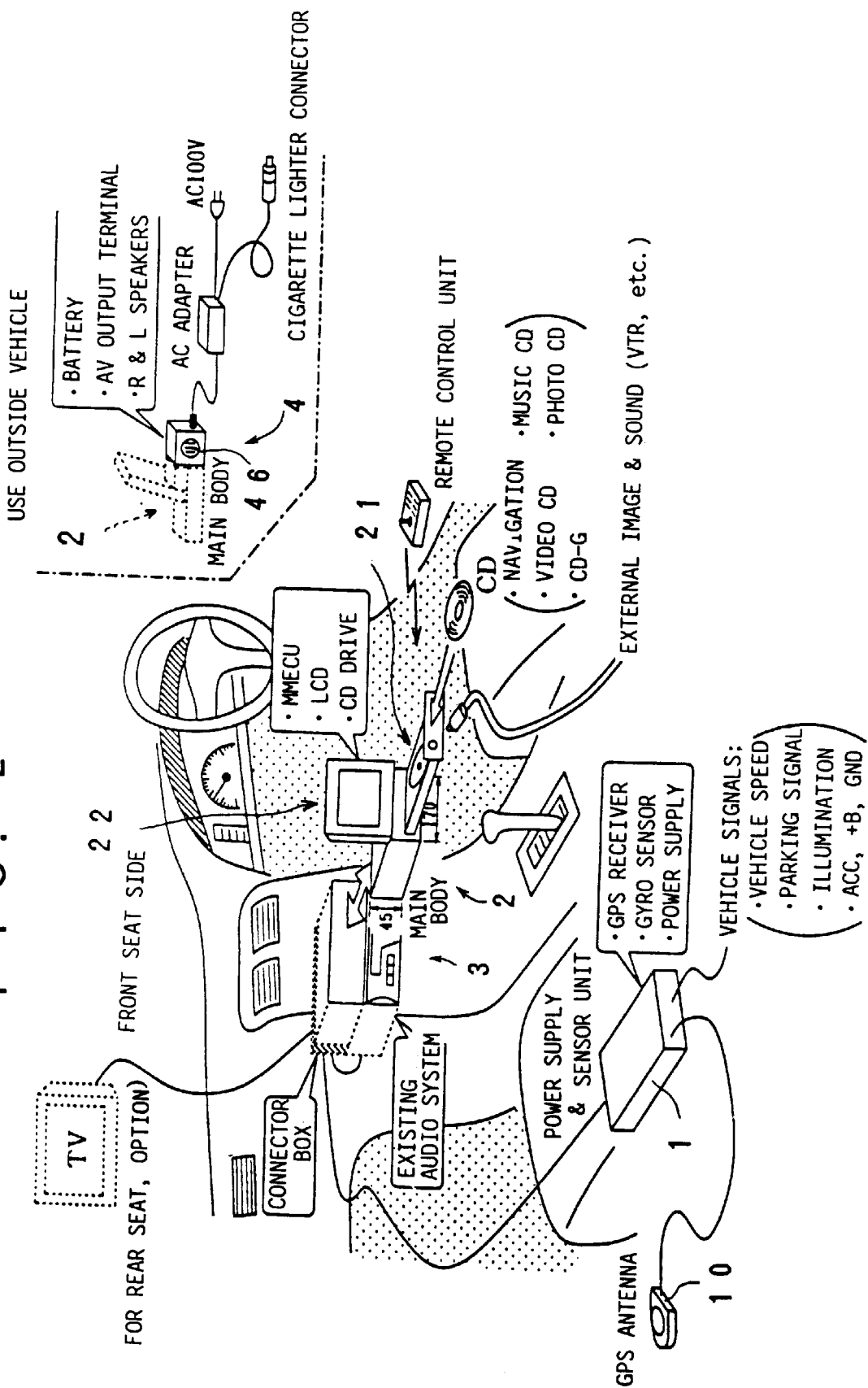
FIG. 2 is a perspective view showing the entire structure of the apparatus of the first preferred embodiment.
Figure 3:
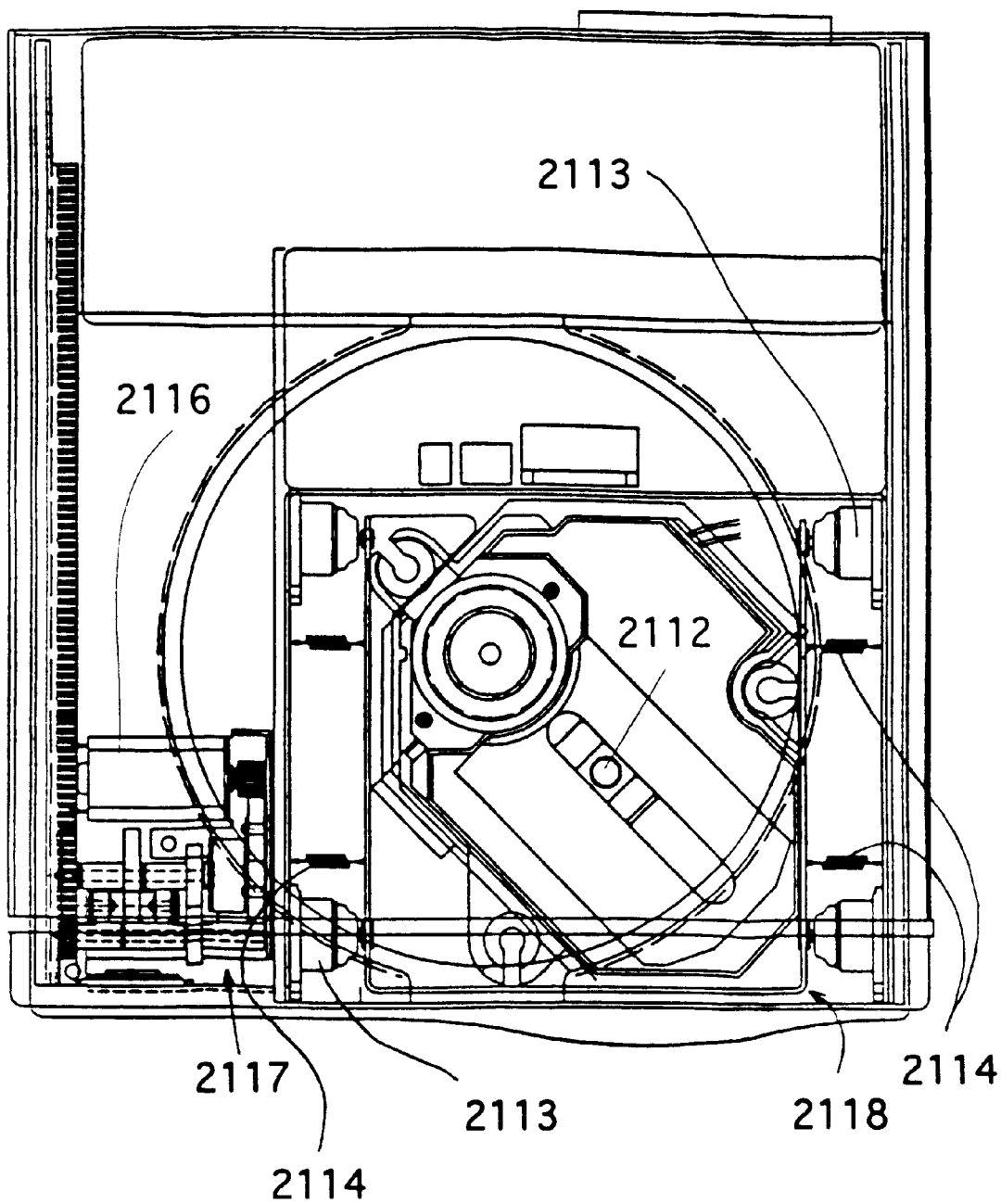
FIG. 3 is a plan view showing the detachable unit of the first preferred embodiment.
Figure 4:
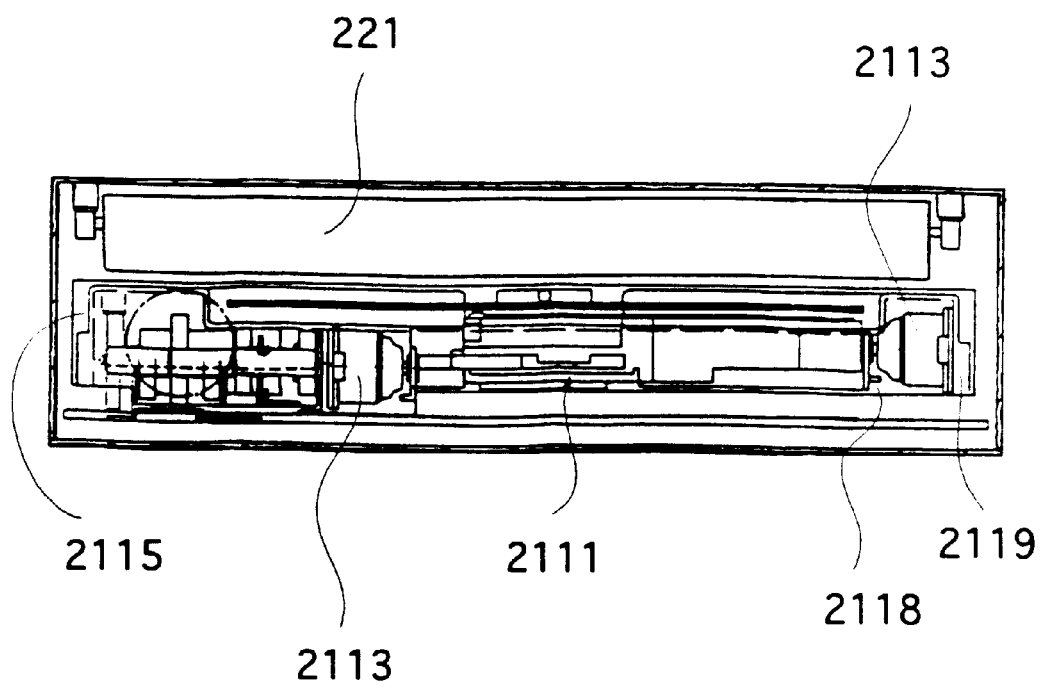
FIG. 4 is a front view showing the detachable unit of the first preferred embodiment.

As shown in FIG. 1 and FIG. 2, the GPS receiver 11 is connected to a GPS antenna 10 provided at a proper position inside a vehicle via a GPS antenna cable. In response to a control signal from the I/O ECU 13, the GPS receiver 11 obtains the distances to and the positions of at least three GPS satellites which make it possible to perform trigonometrical survey.

The gyroscope 12 is disposed at a proper position inside the vehicle, and outputs an angular velocity signal to the I/O ECU 13.

The I/O ECU 13 processes vehicle signals such as a vehicle speed signal, a parking signal and an accessory (ACC) signal, and outputs processed signals to the MMECU 20.

The power supply circuit 14 supplies electrical power to all components through the I/O ECU 13 and the MMECU 20 via power lines.

As shown in FIG. 1, the liquid display 22 consists of an LCD panel and back light unit 221, an image signal processing section 222 for outputting an image signal to the LCD panel based on an image signal (NTSC or analog RGB) from the MMECU 20, and a loading control section 223 provided with a motor 224 for opening and closing the LCD panel.

As shown in FIG. 1, the CD unit 21 consists of a CD data pickup section 211 for reading out CD data from a loaded CD-ROM, a CD pickup mechanism control section 212 for controlling the CD pickup mechanism of the CD data pickup section 211 based on a CD-drive control signal from the MMECU 20 and for transferring the CD data read out by the pickup section to the MMECU 20, and a loading control section 213 provided with a motor which is driven based on CD drive open and close signals from the CD pickup mechanism control section 212.

The CD pickup mechanism control section 212 outputs to the CD data pickup section 211 servo control signals for focusing, a spindle motor, a thread motor, and tracking of the CD pickup section.

The MMECU 20 exchanges signals with the I/O ECU 13 for data communication, controls the above-described various components, and controls an existing audio unit 103 installed in the vehicle if necessary.

As shown in FIG. 3–FIG. 6, the above-described LCD panel and back light 221 is projectably disposed in the upper portion of the detachable unit 2, which is detachably installed into a unit space (opening of 1 DIN: 178×50 mm) within the center console of the vehicle. The LCD loading motor 224, an LCD loading gear box, and a rack 226 are disposed on the rear side of the LCD panel and back light 221 so as to drive the LCD panel and back light 221.

As shown in FIG. 3–FIG. 6, a CD spindle section 2111 is centrally disposed in the lower portion of the detachable unit 2, and a CD pickup sensor 2112 is disposed such that it faces the CD spindle section 2111. Four dampers 2113 and four springs 2114 are fixed to a frame 2119 so as to support a member 2118 to which the CD pickup sensor 2112 is fixed. A loading motor 2116 and a gear box 2117 for loading a tray 2115 of the CD unit 21 are disposed at the front-left corner.

Figure 5:
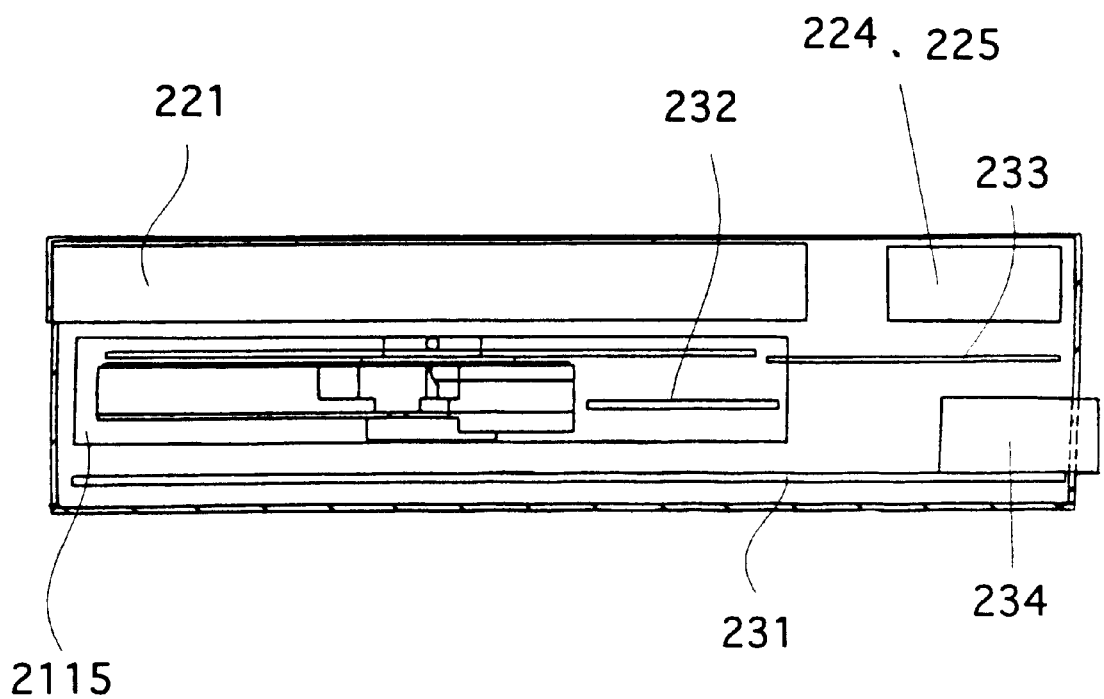
FIG. 5 is a side view showing the detachable unit of the first preferred embodiment.
Figure 6:
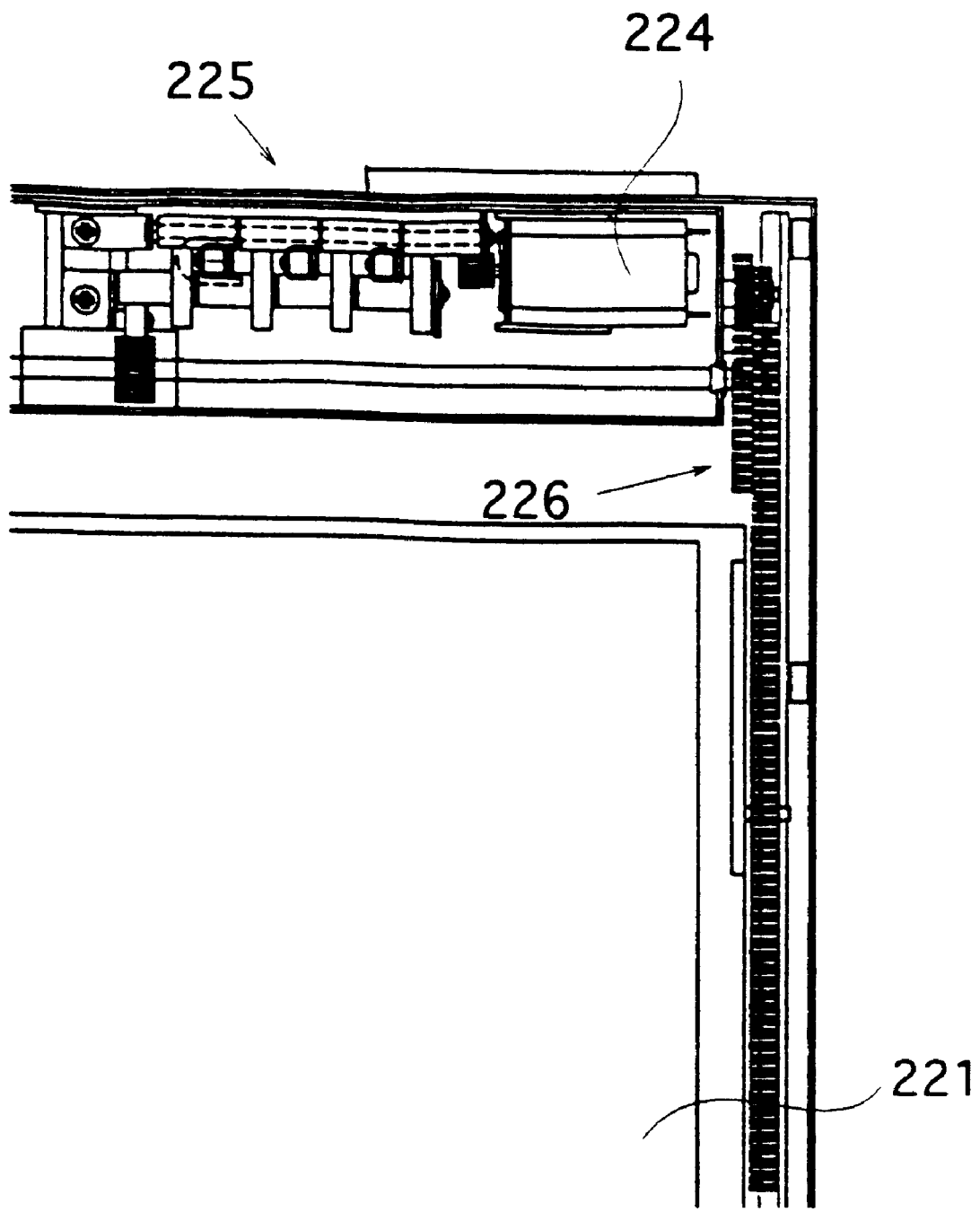
FIG. 6 is an another plan view showing the detachable unit of the first preferred embodiment.

As shown in FIG. 5, a main board 231 is disposed at the lowermost position of the detachable unit 2, and a CD control board 232 is disposed at the central portion thereof. An LCD board 233 is disposed at the rear side, and an external connector 234 is disposed at a rear end.

A small circular speaker 235 is disposed at the lower-left corner of the front face of the detachable unit 2.

Figure 7:
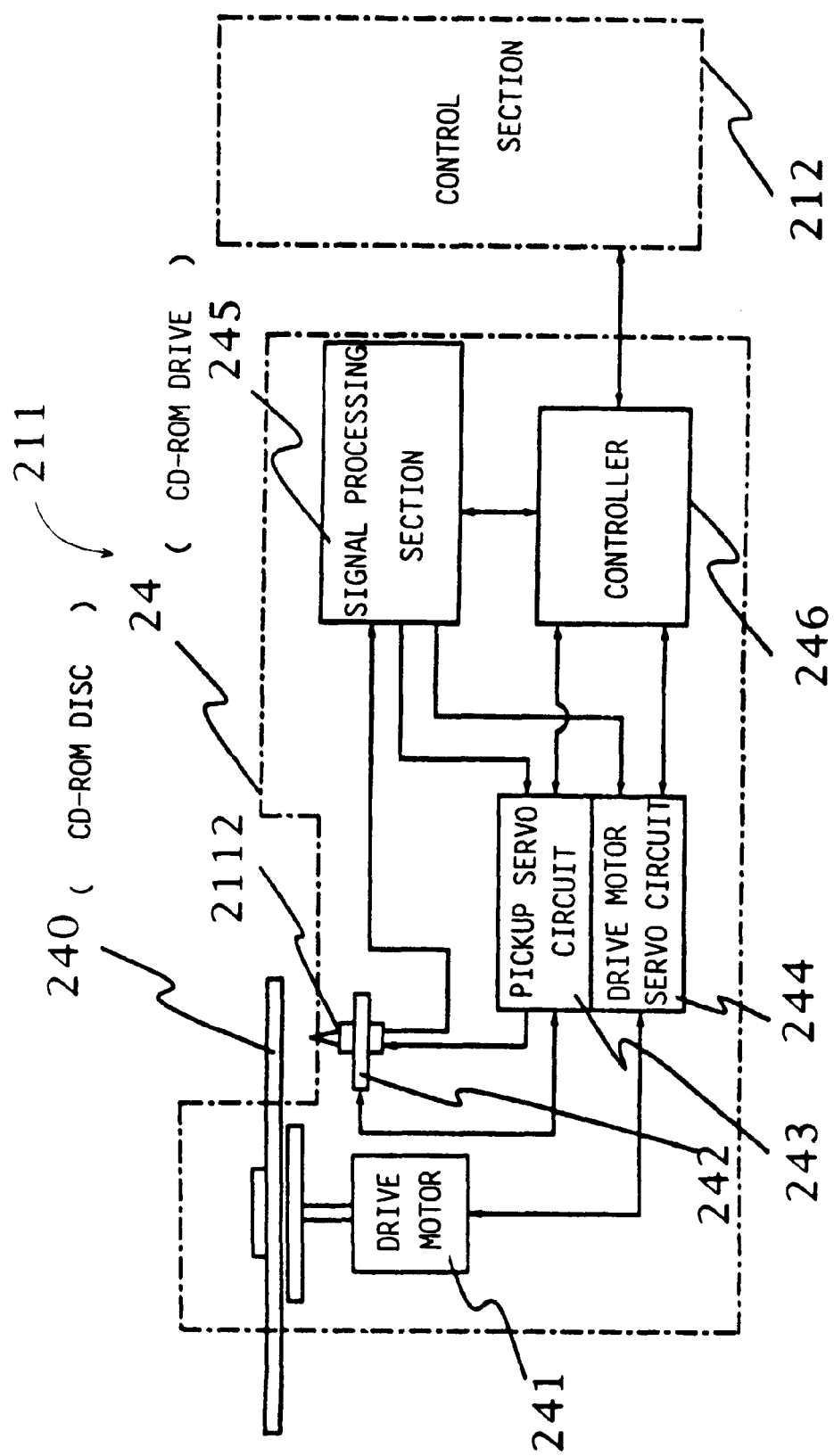
FIG. 7 is a block diagram showing the CD drive of the first preferred embodiment.

The CD data pickup section 211 will be described in further detail with reference to FIG. 7. On the CD-ROM disc 240, various kinds of data such as map data, road data, intersection data, guidance data, photographic data of registered points are recorded at respective addresses together with respective address sizes. The recording has been performed by a CLV (Constant Linear Velocity) method so as to increase the record density. This disc 240 has a structure which allows the disc 240 to be loaded onto and unloaded from the CD-ROM drive 24.

The CD-ROM drive 24 for reading out various data stored at predetermined addresses while rotating the CD-ROM disk 240 consists of a drive motor 241, a pickup 2112, a feed mechanism 242, a servo circuit 243 for the pickup, a servo circuit 244 for the drive motor, a signal processing section 245, and a controller 246.

The drive motor 241 is a spindle motor such as a motor with brushes, or a hall motor, and adapted to drive the disc 240 to rotate. The pickup 2112 is provided with a laser light source, an objective lens, a photodetector, etc., and reads out data recorded on the disc 240.

The feed mechanism 242 moves the pickup 2112 to a predetermined position so as to allow the pickup 2112 to read out data recorded at predetermined addresses of the disc.

The servo circuit 243 for the pickup controls the feed amount of the feed mechanism 242 and also controls the position of the objective lens of the pickup 2112 such that the signal surface of the disc 240 is located within the depth of the focus of the laser beam from the pickup 2112 and the laser beam follows a signal train of the disc, regardless of sway of the surface, eccentric rotation, and the like of the disc 240.

The servo circuit 244 for the drive motor 244 controls the rotational speed of the drive motor 241, based on a playback synchronization signal read out from the disk 240 by the pickup 2112, such that the disc 240 rotates at a constant linear velocity.

The signal processing section 245 amplifies an output signal from the photodetector of the pickup 2112, performs waveform shaping for the amplified signal to obtain a digital signal, and perform error correction for the digital signal, thereby retrieving the data recorded on the disc 240.

The controller 246 transmits the data retrieved by the signal processing section 245 to the control section, and outputs control signals to the servo circuit 243 for the pickup and the servo circuit 244 for the drive motor based on various requests such as a data reading out request output from the control section.

Next, a battery unit 104 which is needed to use the detachable unit 2 outside the vehicle will be described with reference to FIG. 8–FIG. 10.

An antenna 41 is disposed on the upper surface such that it is located at the front portion thereof. Two tone control volumes 42 are disposed at the center of the front face, and an image/sound terminal input/output switch 43 is disposed next to the volumes 42. Further, three image/sound input/output terminals 44 are disposed on the right side of the switch 43, and a terminal 45 for receiving power of DC 12 V is disposed at the lower left corner of the front face.

Figure 9:
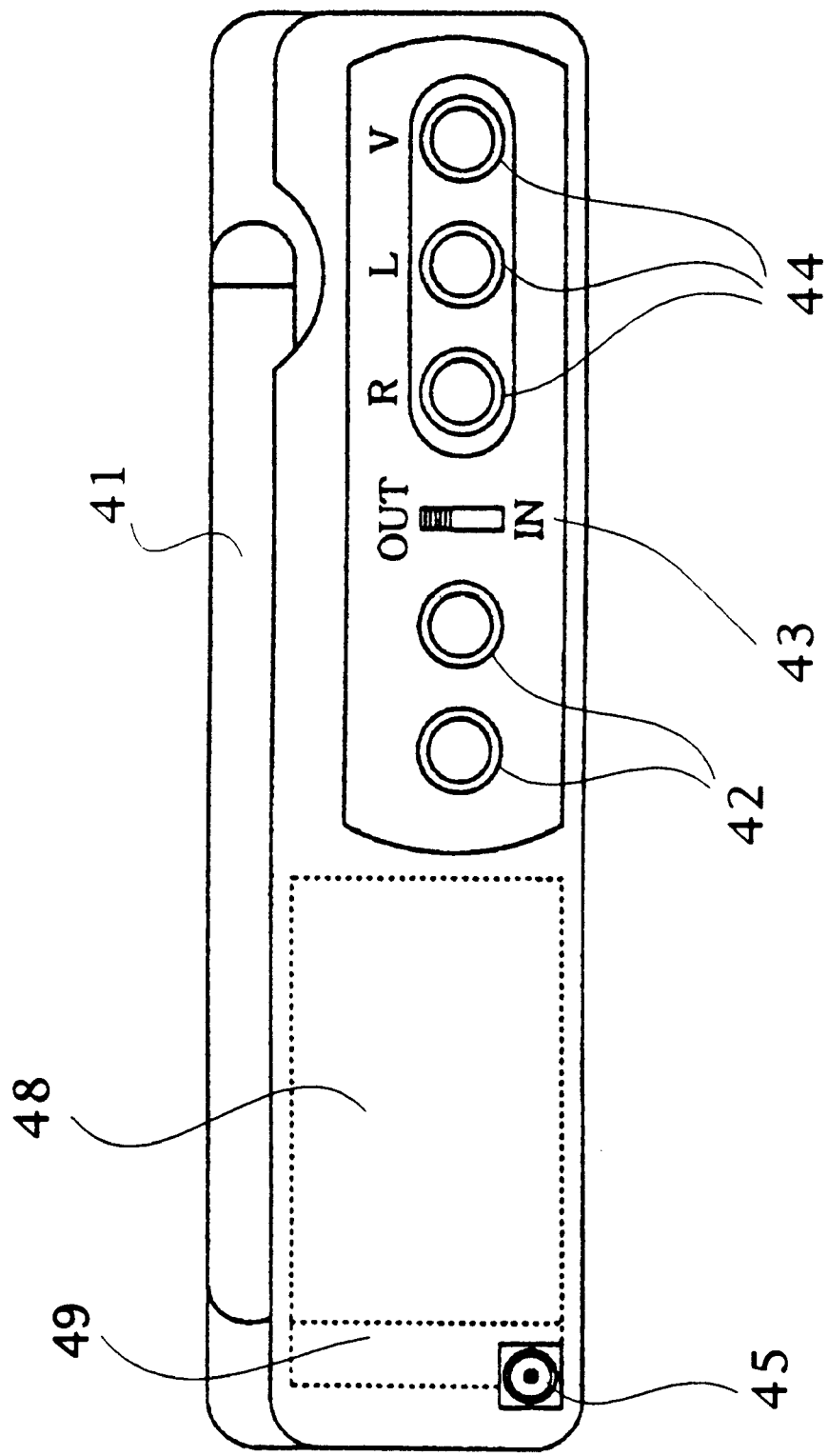
FIG. 9 is a front view showing the battery unit of the first preferred embodiment.
Figure 10:
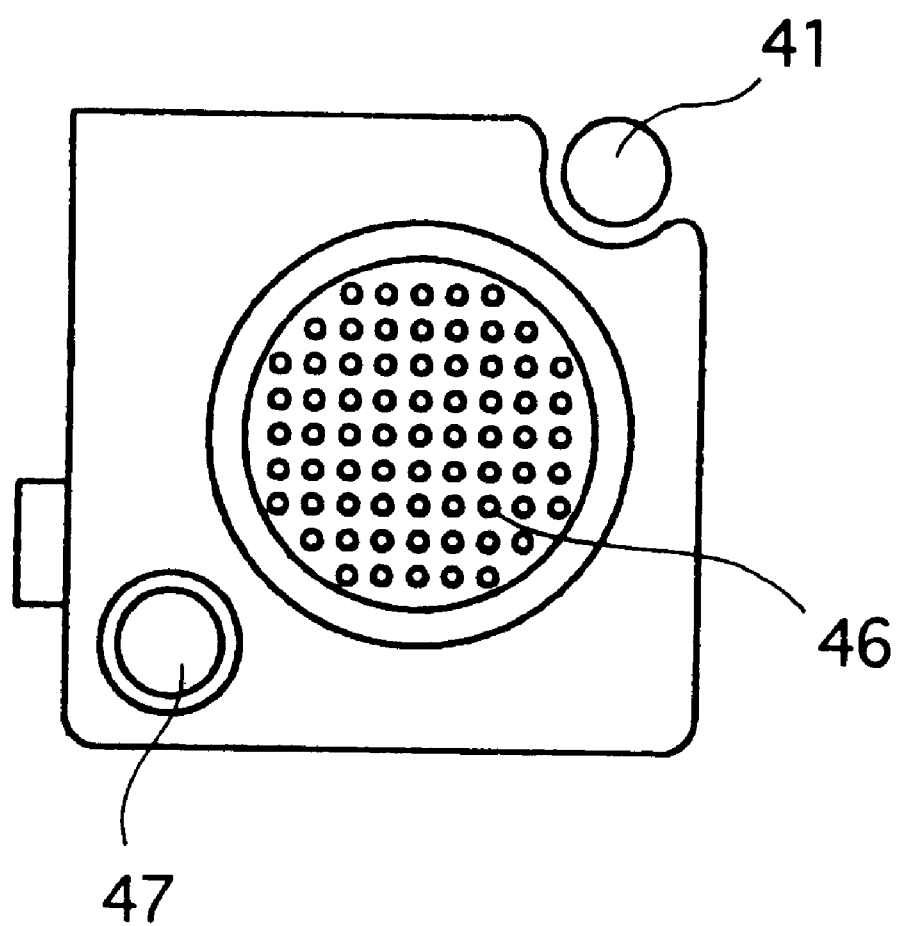
FIG. 10 ia a side view showing the battery unit of the first preferred embodiment.

As shown in FIG. 10, right and left speakers 46 are disposed on both side faces, and a microphone input terminal 47 is disposed on the right-side side face. As shown in FIG. 8 and FIG. 9, a battery pack 48 and a battery charging circuit 49 are disposed within the unit at the left side thereof.

In the navigation apparatus for vehicles according to the first preferred embodiment, serving as a navigation apparatus for vehicles which comprises the GPS receiver 11 connected to the GPS antenna 10, the gyroscope 12, the I/O ECU 13 for processing vehicle signals such as a vehicle speed signal, the CD unit 21 for driving the CD-ROM 240 containing map information, the liquid crystal display 22 for displaying a map, and the MMECU 20 for controlling the entire operation. This navigation apparatus for vehicles can perform navigation based on outputs from the GPS and the gyroscope 12. In addition, the apparatus can be used at home, at other places for stay, outdoors by removing the detachable unit 2 including at least the CD unit 21, the liquid display 22 and the MMECU 20 from the vehicle.

In the navigation apparatus for vehicles according to the first preferred embodiment, the detachable unit 2 including the CD unit 21, the liquid crystal display 22 and the MMECU 20 is installed into the unit space of 1 DIN within the console of the vehicle, as shown in FIG. 2.

Figure 11:
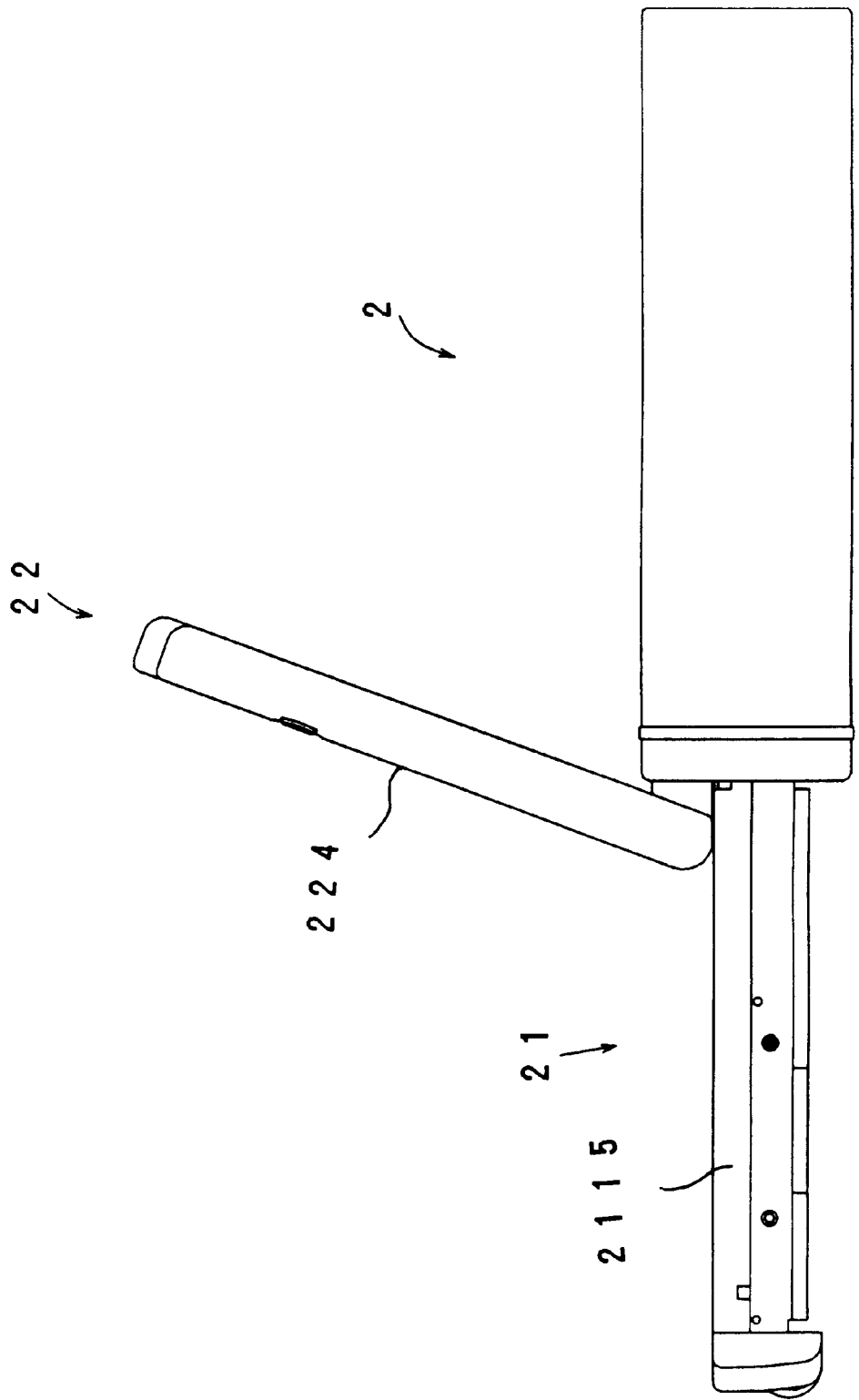
FIG. 11 is a side view showing a state in which the liquid crystal display and the CD tray of the first preferred embodiment are projected.

In the navigation apparatus for vehicles according to the first preferred embodiment, since the CD unit 21 is disposed in the detachable unit 2 such that the CD unit 21 is allowed to project from the detachable unit 2, as shown in FIG. 11, the CD unit 21 is brought into a projected state when the CD-ROM 240 is loaded or unloaded.

In the navigation apparatus for vehicles according to the first preferred embodiment, when the liquid crystal display 22 is used, the liquid crystal display 22 is projected from the detachable unit 2 in such a direction that it approaches a driver (in the rearward direction of the vehicle), as shown in FIG. 11, and the front portion of the display 22 is swung about the inner portion thereof, which serves as a pivot, in the projected state. With this operation, the display portion 224 located on the front face, which initially faced downward, faces the driver.

Figure 8:
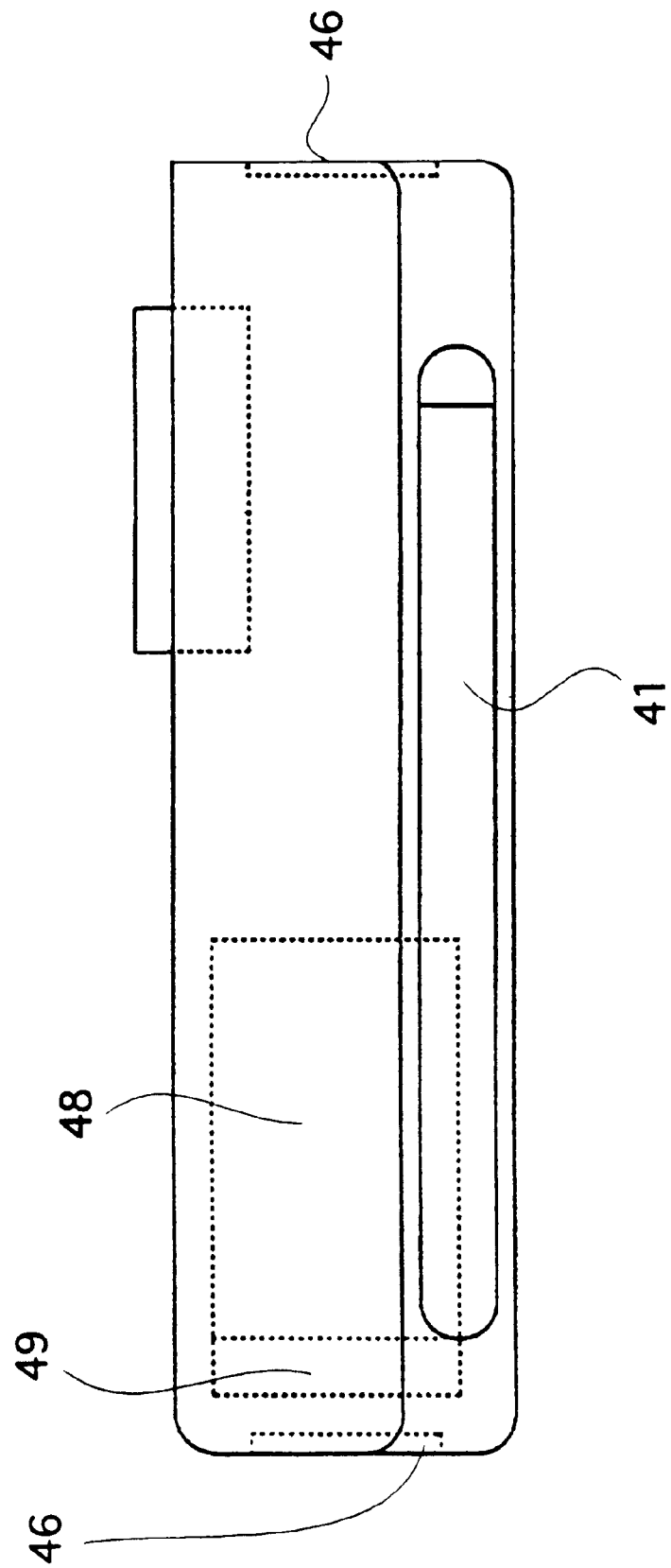
FIG. 8 is a plan view showing the battery unit of the first preferred embodiment.

In the navigation apparatus for vehicles according to the first preferred embodiment, for use outside the vehicle, the AC 100 V connector or the cigarette lighter connector is connected to an AC 100 V connector or a cigarette lighter, as shown in FIG. 8, whereby the battery unit 104 which functions as an auxiliary unit and which includes the battery pack 48, the amplifier and the speaker 46 drives the CD unit 21, the liquid crystal display 22 and the MMECU 20 within the detachable unit 2, and sound is output directly from the speakers 46.

In the navigation apparatus for vehicles according to the first preferred embodiment providing the above-described action, there is provided the effect of making it possible to perform navigation based on outputs from the GPS and the gyroscope 21. In addition, since use of the apparatus outside a vehicle can be realized by removing from the vehicle the detachable unit 2 including at least the CD unit 21, the liquid crystal display 22 and the MMECU 20, it is possible to perform drive simulation, listen to music, watch movies and appreciate other AV programs outside the vehicle, such as at home, in a hotel, in an inn, at other places for stay, outdoors, and also to increase the accuracy of navigation.

In the navigation apparatus for vehicles according to the first preferred embodiment, the detachable unit 2 including the CD unit 21, the liquid crystal display 22 and the MMECU 20 is installed into the unit space of 1 DIN within the console of the vehicle. Accordingly, there are provided the effects of improving the appearance and eliminating obstructions.

In the navigation apparatus for vehicles according to the first preferred embodiment, since the tray 2115 of the CD unit 21 is brought into a projected state when the CD-ROM 240 is loaded or unloaded, as shown in FIG. 11, there is provided the effect of facilitating the loading/unloading of the CD-ROM 240.

In the navigation apparatus for vehicles according to the first preferred embodiment, when the liquid crystal display 22 is used, the liquid crystal display 22 is projected from the detachable unit 2 so as to bring it into a projected state, as shown in FIG. 11 and FIG. 12, and is swung about the rear end thereof such that the display portion 224 thereof located on the front face faces the driver. Accordingly, there is provided the effects that the display portion 224 can be easily viewed when being used, and that the liquid crystal display does not become a hindrance when not being used because it is retracted into the detachable unit 2, as shown in FIG. 2.

In the navigation apparatus for vehicles according to the first preferred embodiment, when being used outside the vehicle, the battery unit 104, which serves as the auxiliary unit and includes the battery, the amplifier and the speakers, drives the CD unit 21, the liquid crystal display 22 and the MMECU 20 within the detachable unit 2, and sound is output directly from the speakers 46. Accordingly, there is provided the effect of facilitating the use outside the vehicle in a reliable manner.

In the navigation apparatus for vehicles according to the first preferred embodiment, since the I/O ECU 13 and the power supply circuit are not provided in the detachable unit 2, there is the effect of making the detachable unit 2 lighter and more compact than those of second and third preferred embodiments, which will be described later.

(Second Preferred Embodiment)

Figure 13:
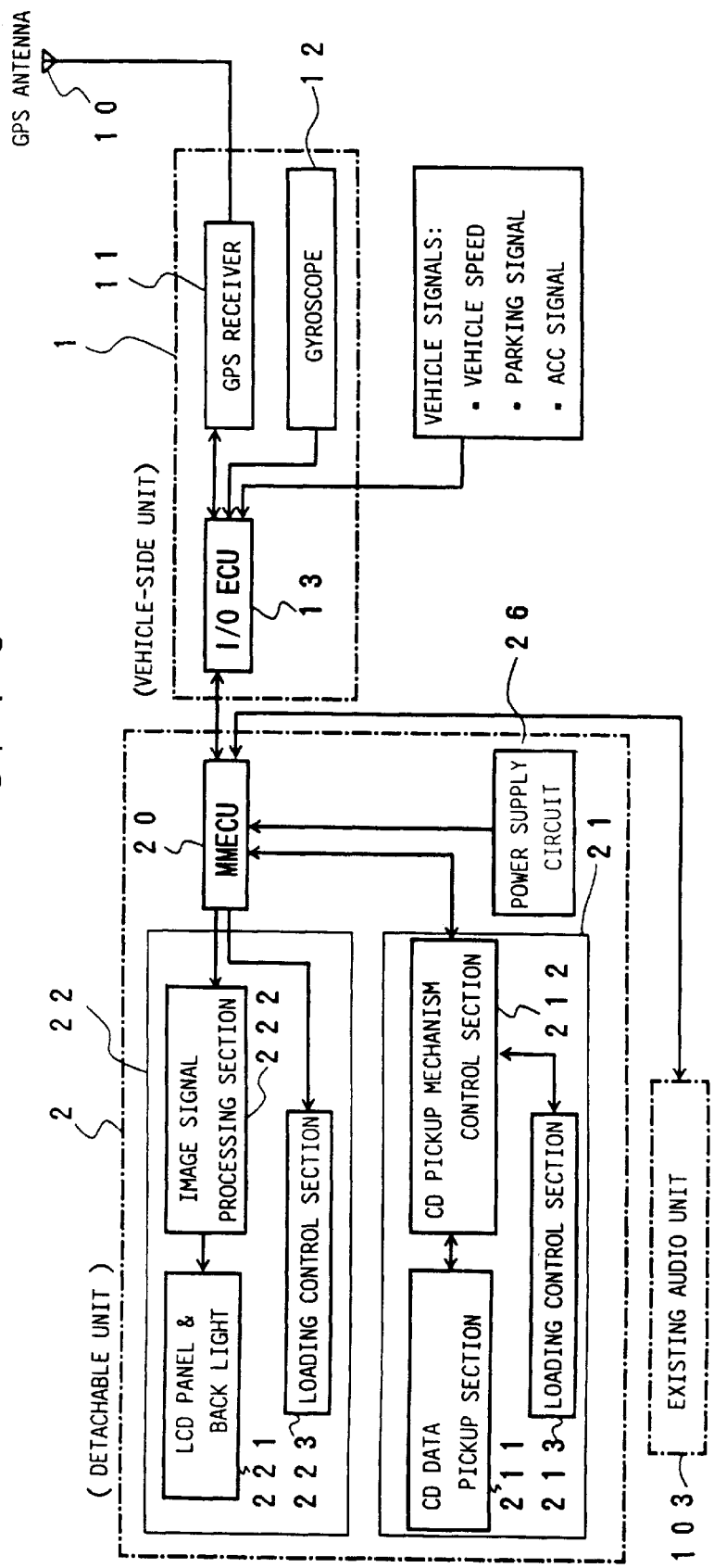
FIG. 13 is a block diagram showing an apparatus according to a second preferred embodiment of the present invention.

A navigation apparatus for vehicles according to the second preferred embodiment differs from that of the first preferred embodiment only in that the power supply circuit disposed in the vehicle-side unit 1 in the first preferred embodiment is disposed within the detachable unit 2 as a power supply circuit 26, as shown in FIG. 13. Since the power supply circuit 26 is disposed within the detachable unit 2, the power supply circuit 26 provided in the detachable unit 2 adjusts the voltage to levels required to drive the CD unit 21, and the liquid crystal display 22. For example, electrical power is supplied to the liquid crystal display 22 after its voltage is changed to 5 V, while the electrical power is supplied to the CD unit 21 after its voltage is changed to 9 V. Accordingly, there is provided the effect of making it possible to use the detachable unit 2 by only connecting it to a vehicle, a battery or a commercial power.

In other words, the use of the power supply circuit 26 makes it possible to supply power to all the apparatuses from a single power source so as to drive them.

(Third Preferred Embodiment)

Figure 14:
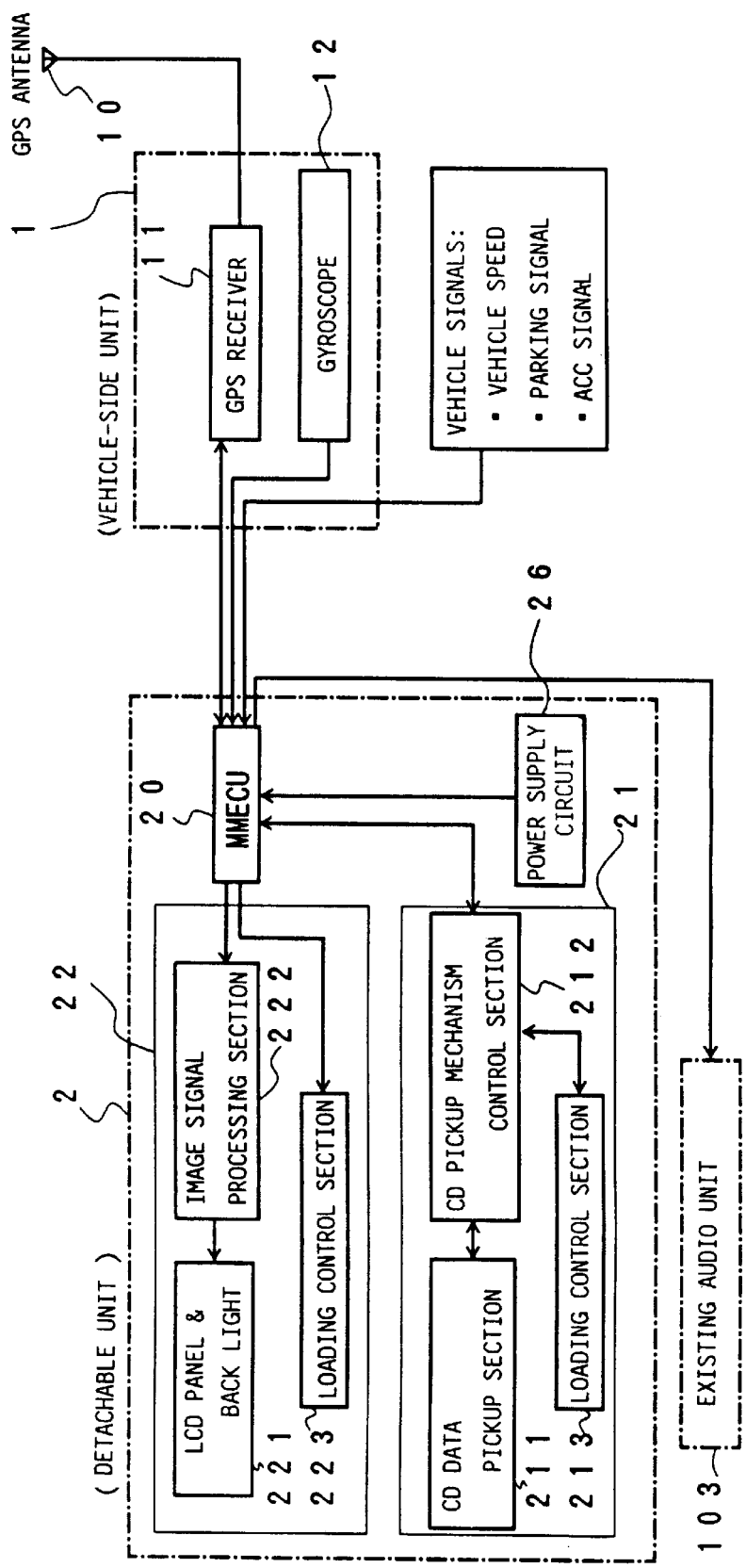
FIG. 14 is a block diagram showing an apparatus according to a third preferred embodiment of the present invention.

A navigation apparatus for vehicles according to the third preferred embodiment differs from that of the first preferred embodiment only in that the I/O ECU disposed in the vehicle-side unit 1 in the first preferred embodiment is integrated with the MMECU disposed within the detachable unit 2, as shown in FIG. 14. Accordingly, there is provided the effect of simplifying the ECU of the entire apparatus.

(Fourth Preferred Embodiment)

Figure 15:
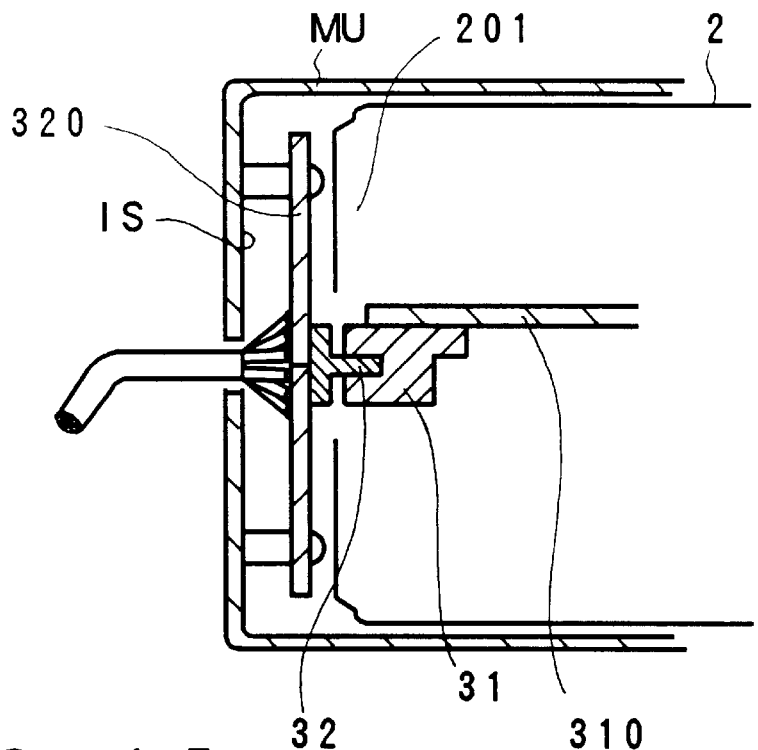
FIGS. 15a and 15b are a sectional view showing states after and before the attachment of the connector in an apparatus according to a fourth preferred embodiment of the present invention.
Figure 15:
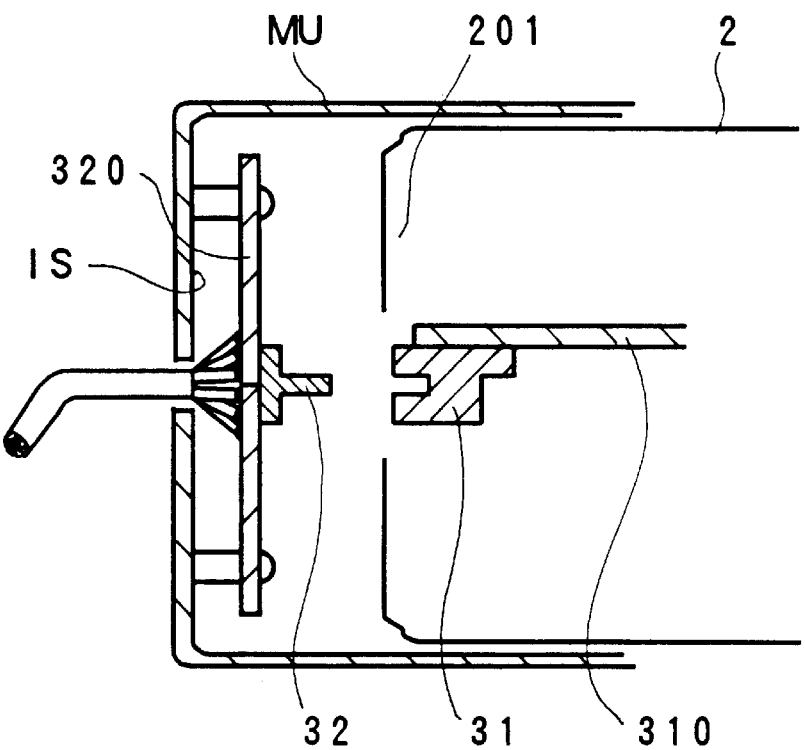
Figure 16:
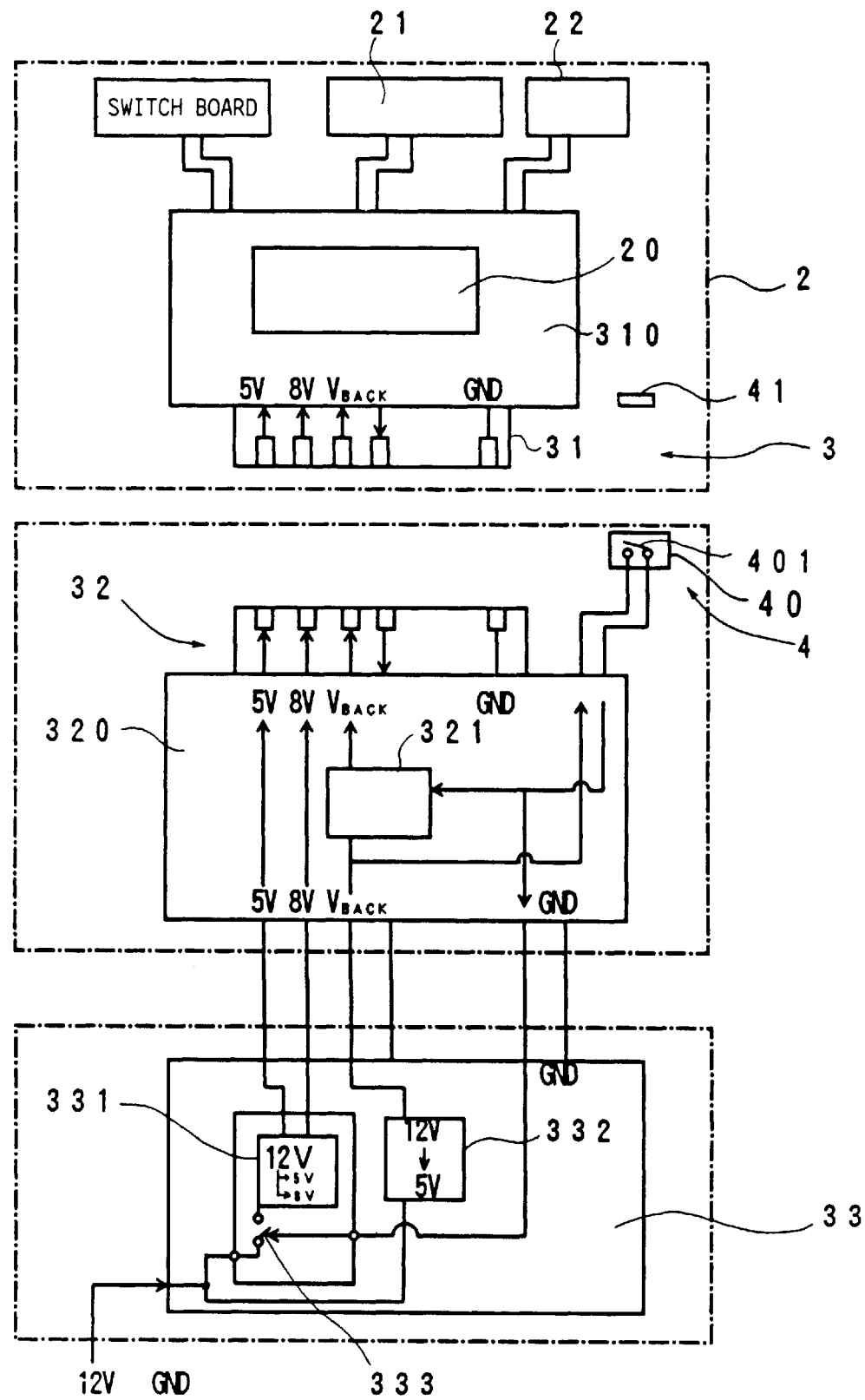
FIG. 16 is a block diagram showing the carryable unit, the mounting unit and the power supply unit of the apparatus of the second preferred embodiment in which a connector and a detection switch are provided.
Figure 17:
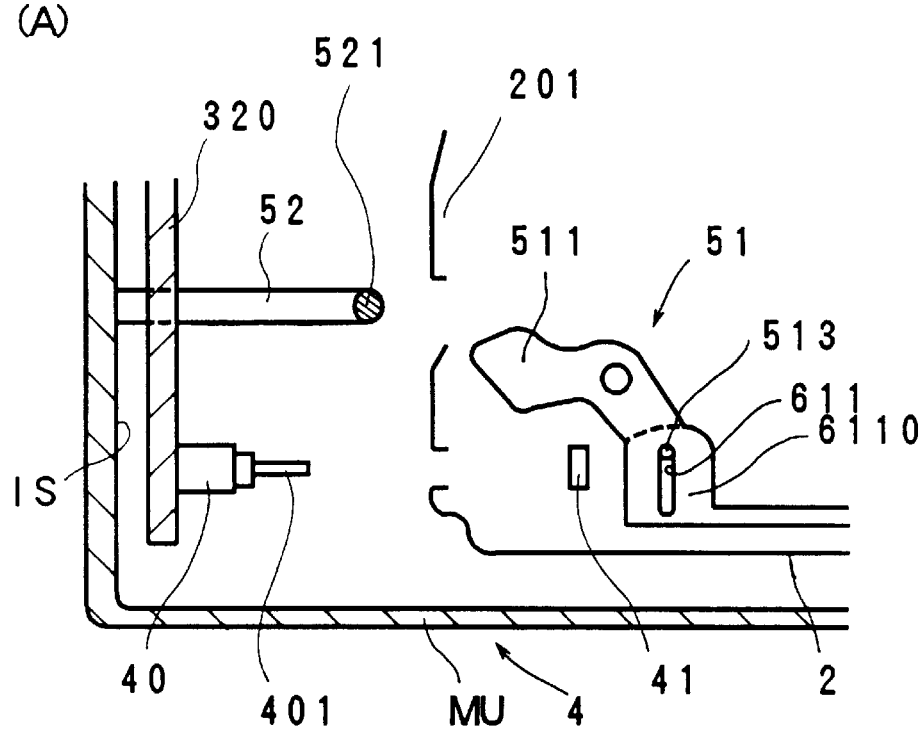
FIGS. 17a and 17b are a partial sectional view showing states before and after the engagement of the connector and the detection switch in the apparatus of the fourth preferred embodiment.
Figure 17:
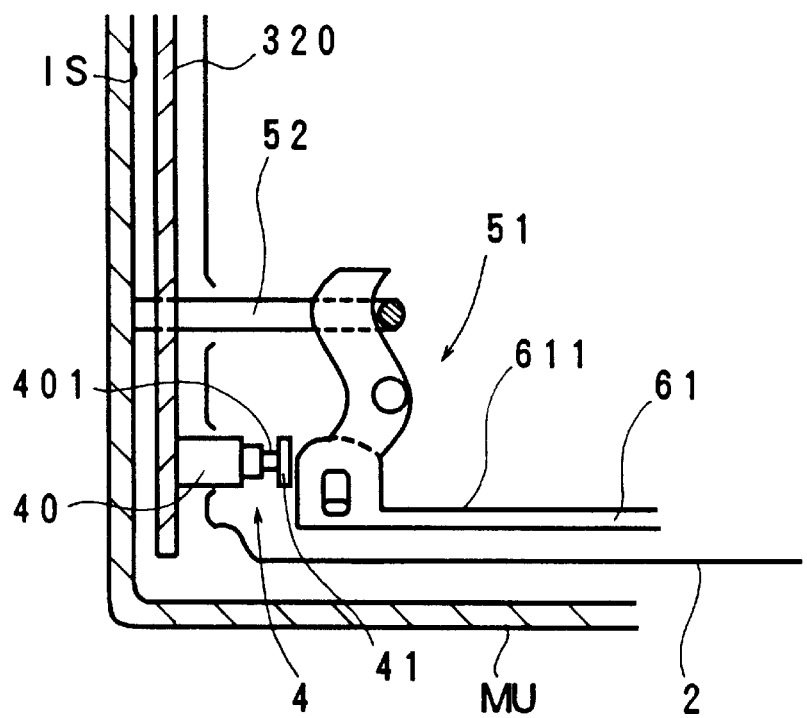

A navigation apparatus for vehicles according to the fourth preferred embodiment is an improvement regarding the first preferred embodiment, in which the detachable unit 2 to be inserted into the unit space of the console of the vehicle is connected to the vehicle body side via a connector 3, as shown in FIG. 15–FIG. 17, and a detection switch 4 which is turned off before the separation of the connector 3 is interposed between the detachable unit 2 and the vehicle body.

That is, as shown in FIG. 15 and FIG. 16, a male connector element (one connector element) 31 of the connector 3 is disposed on the rear portion 201 of a carryable unit constituting the detachable unit 2 (the rear portion with respect to the front face of the console, i.e., the front portion in the traveling direction of the vehicle). In detail, the male connector element 31 is connected to the CD unit 21, the liquid crystal display 22 serving as the display unit and the MMECU 20, and is disposed at the rear end of the MMECU board 310. A female connector element (the other connector element) 32 of the connector 3 is disposed on a vehicle body-side portion facing the rear portion 201 of the carryable unit 2. In detail, the female connector element 32 is disposed on a connector board 320 disposed on an inner wall IS of a mounting unit MU within the console of the vehicle. When the carryable unit serving as the detachable unit 2 is inserted into the mounting unit MU of the console of the vehicle, the connector elements 31 and 32 of the connector 3 are mechanically and electrically connected together.

In each of the connector elements 31 and 32 constituting the connector 3, a plurality of terminals each having a constant length are formed for 5 V power supply, 8 V power supply, signal lines, and a ground line, as shown in FIG. 15 and FIG. 16. The connector board 320 is connected to a power supply unit 33 provided with a power supply circuit comprising a first voltage drop circuit 331, and a second voltage drop circuit 332. The first voltage drop circuit 331 functions as a power supply for the motors and the IC boards. The second voltage drop circuit 332 functions as a backup power supply for maintaining an on state even when an engine switch is turned off.

As shown in FIG. 16 and FIG. 17, the detection switch 4 consists of a detection switch portion 40, and a contact member 41. The detection switch 4 is disposed on a vehicle body-side portion, i.e., at one end of the connector board 320 disposed on the inner wall IS of the mounting unit MU within the console of the vehicle. The contact member 41 is disposed on the rear portion 201 of the carryable unit 2 at a position facing the detection switch portion 40. That is, the contact member 41 is integrally formed at one end 611 of a rod 61 of an unlock mechanism 6, which will be described later.

As shown in FIG. 16 and FIG. 17, the detection switch portion 40 is connected to an on/off circuit 320 provided on the connector board 320 and connected to the backup power supply 332. The detection switch portion 40 has a stroke member 401 which moves within a predetermined range. When a lever 64 of the unlock mechanism 6 is swung to a horizontal position, which is an unlock position, the rod 61 and the contact member 41 separate from the detection switch portion 40, so that the contract member 41 separates from the stroke member 401 before the respective terminals of the connector elements 31 and 32 of the connector 3 separate from each other. This operation turns off the on/off circuit 321, which is connected to the backup power supply 332 which remains on even when the engine switch is turned off.

As shown in FIG. 17–FIG. 26, in the fourth preferred embodiment, there are provided a lock mechanism 5, an unlock mechanism 6, an elastic holding mechanism 7, and a display positioning mechanism 8. The lock mechanism 5 has engagement members for locking the detachable unit 2, which is inserted into the mounting unit MU of the unit space within the console of the vehicle, to the vehicle body. The unlock mechanism 6 breaks a locked state of the detachable unit 2 when the detachable unit 2 is removed. The elastic holding mechanism 7 elastically holds the detachable unit 2. The display positioning mechanism 8 positions the display 22 at a plurality of projected positions.

As shown in FIG. 17–FIG. 21, the lock mechanism 5 includes first engagement members 51 and second engagement members 52. The first engagement members 51 are disposed at the rear-right and rear-left corners of the detachable unit 2 so as to fix the detachable unit 2 to the vehicle body. The second engagement members 52 have a generally U-like shape, and are provided at the right and left portions of a vehicle body-side portion which face the rear-right and rear-left corners of the detachable unit 2.

Each of the first engagement members 51 is formed by a member which has a generally S-like shape and which swings about a pin inserted into the central portion of the member. Bent portions 511 formed at first ends of the engagement members 51 are engaged with forward end vertical portions 521 of the generally U-shaped second engagement members 52 which are disposed at the right and left portions of the inner wall IS of the mounting unit MU at the vehicle body side. When the carryable unit constituting the detachable unit 2 is installed into the mounting unit MU of the unit space within the console of the vehicle, the first and second engagement members 51 and 52 engage with each other so as to lock the detachable unit 2 to the vehicle body.

As shown in FIG. 18–FIG. 21, the unlock mechanism 6 consists of rods 61, springs 62, links 63, and levers 64. The first ends 611 of the rods 61 are connected to the first engagement members 51 of the lock mechanism 5, disposed at the right and left ends of the rear portion 201 of the detachable unit 2, and are biased by the springs 62. The first ends 631 of the links 63 are swingably connected to the second ends 612 of the rods 61. The ends 641 of the levers 64 are connected to the second ends 632 of the links 63 and are swung about fulcrums 643. The unlock mechanism 6 maintains the engagement between the first and second engagement members 51 and 52 for locking the detachable unit 2 to the vehicle body, and breaks the engagement so as to break the locked state.

Pins 513 are embedded into the upper surfaces of the straight second ends of the first engagement members 51 of the lock mechanism 5, and the pins 513 are received by slots 6111 formed in horizontal portions 6110 of the first ends 611 of the rods 61. The rods 61 are formed of strip-like members, and longitudinally extending slots 613 are formed in the rods 61. Pins 614 embedded into the side walls of the detachable unit 2 are received by the slots 613. This structure allows the rods 61 to move in the longitudinal direction. The rods 61 are biased rightward by the springs 62 in FIG. 18 and FIG. 19.

The first ends 631 of the straight links 63 are swingably connected to the second ends 612 of the rods 61 via pins 615, and pins 633 are disposed at the second ends 632 of the links 63. The first ends 641 constituting shorter sides of the levers 64 are swingably connected to the pins 633. The fulcrums 643 are disposed at the corner portions of the levers 64, and the second ends 642 constituting the longer sides of the levers 64 functions as operating portions.

The tip ends of the longer sides 642 of the levers 64 located at the right and left sides of the detachable unit are connected with each other to form a reversed C-like shape. When a driver or the like moves the levers 64 from the vertical position shown in FIG. 18 to the horizontal position shown in FIG. 19, the links 63 swing in the clockwise direction, so that the rods 61 move rightward in FIG. 18 and FIG. 20. As a result, the first engagement member 51 swing in the counterclockwise direction, so that the engagement between the first and second engagement members 51 and 52 is broken. At the same time, the contact state between the contact member 41 and the stroke member 401 is broken.

Figure 18:
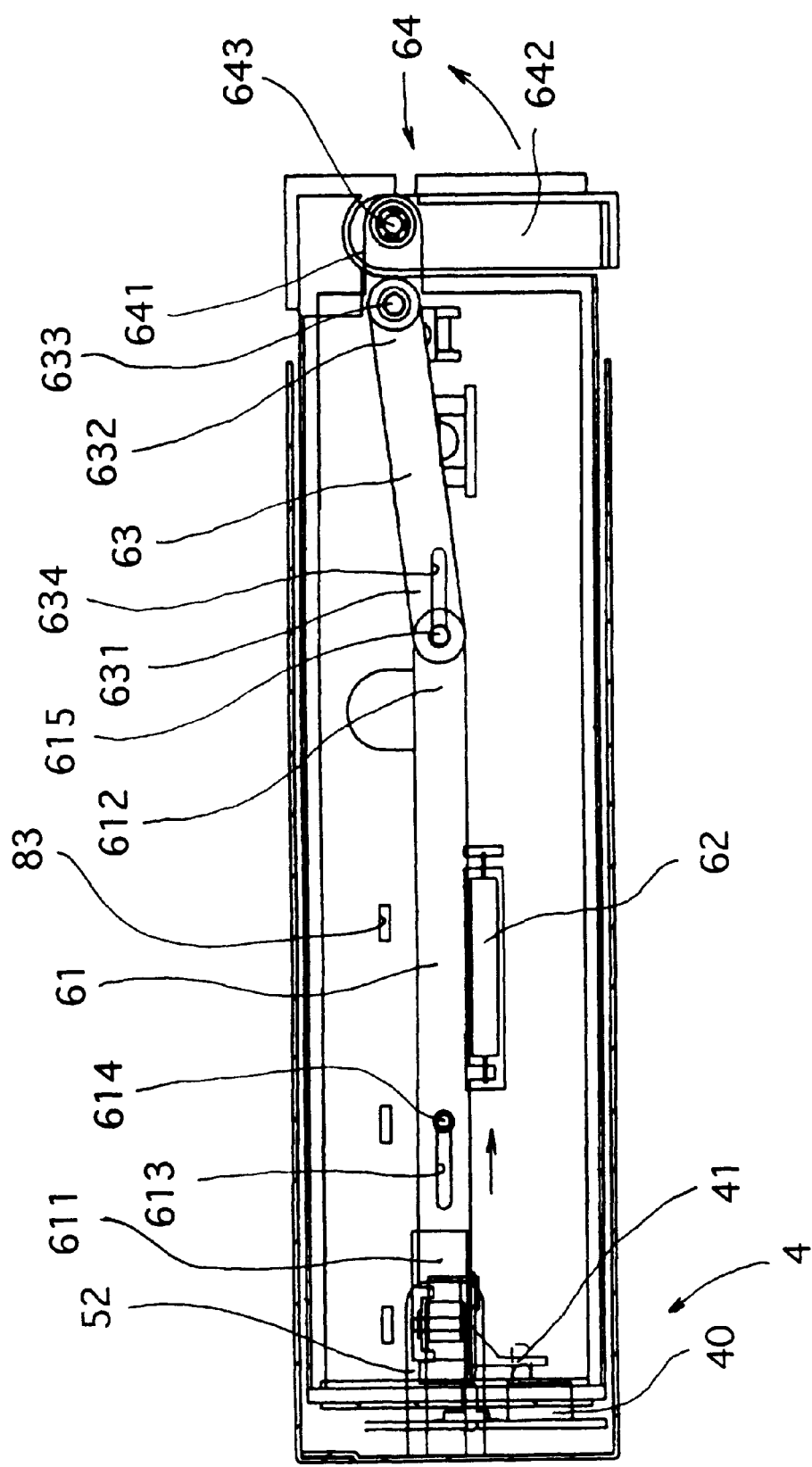
FIG. 18 is a side sectional view showing a locked state of the lock mechanism and the unlock mechanism of the apparatus of the fourth preferred embodiment.
Figure 19:
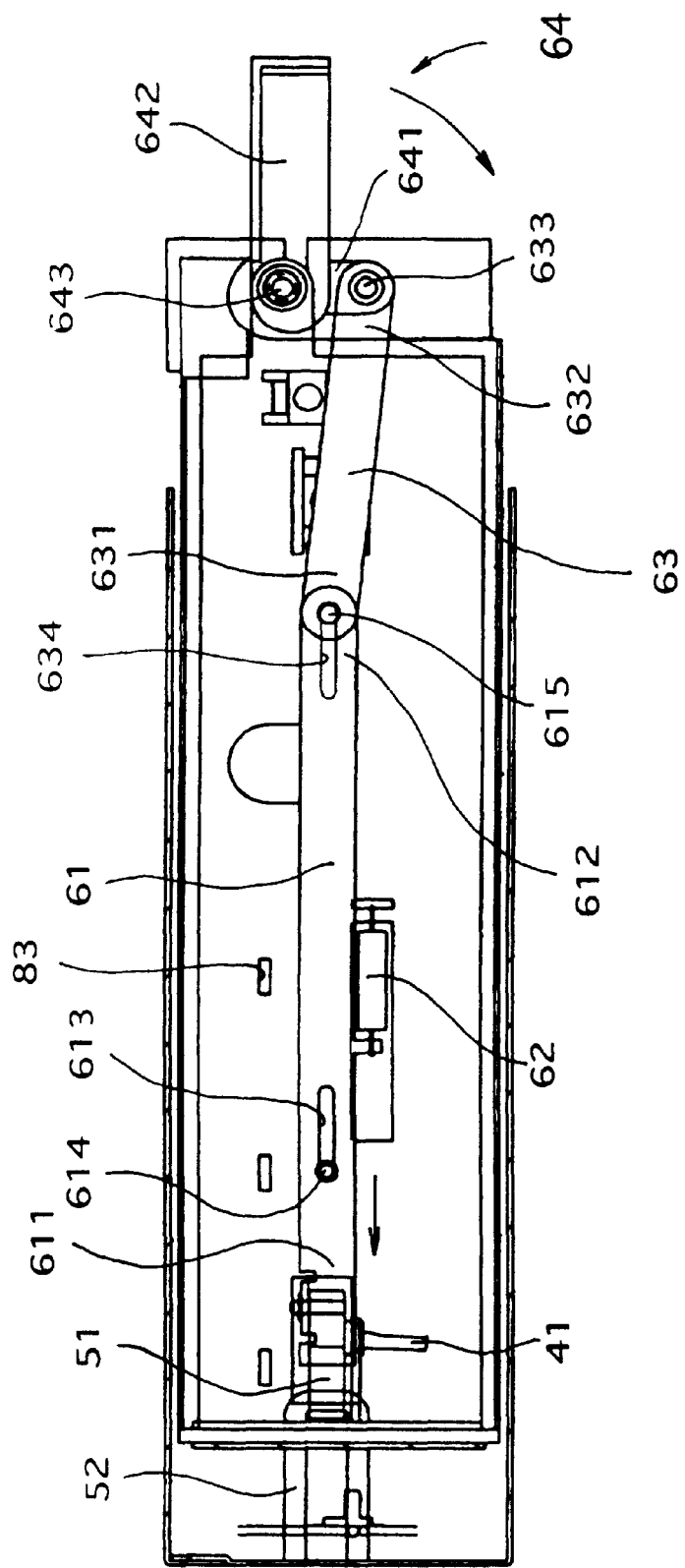
FIG. 19 is a side sectional view showing an unlocked state of the lock mechanism and the unlock mechanism of the apparatus of the fourth preferred embodiment.

As is apparent from FIG. 18 and FIG. 19, the pins 615 embedded into the second ends 612 of the rods 61 are received by longitudinally extending slots 634 formed in the side walls of the detachable unit 2, so that the rods 61 move in the longitudinal direction together with the pins 615 and the slots 613.

Since the first ends 631 of the links 63 swing about the pins 615, the pins 615 hit the left ends of the slots 634 when the links 63 become horizontal due to swing movement of the levers 64. As a result, the rods 61 move to the leftmost position in FIG. 18 and FIG. 19 against the biasing force of the springs 62 (the biasing force becomes maximum). The links 63 are offset from the fulcrums at the corner portions of the levers 64 in both the state in which the right ends of the links 63 are raised from the horizontal position (FIG. 18) and the state in which the right ends of the links 63 are lowered from the horizontal position (FIG. 19). Therefore, the links 63 constitute a reverse link which becomes stable in both the states shown in FIG. 18 and FIG. 19.

Figure 22A:
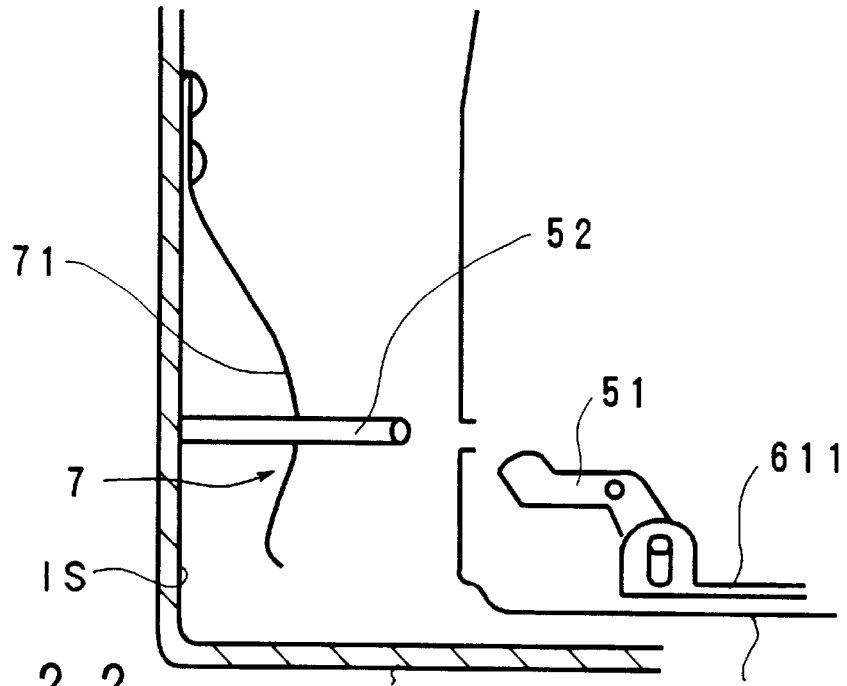
FIGS. 22a and 22b are a partial plan sectional view showing states after and before the elastic holding mechanism of the apparatus of the fourth preferred embodiment enters a holding state.
Figure 22B:
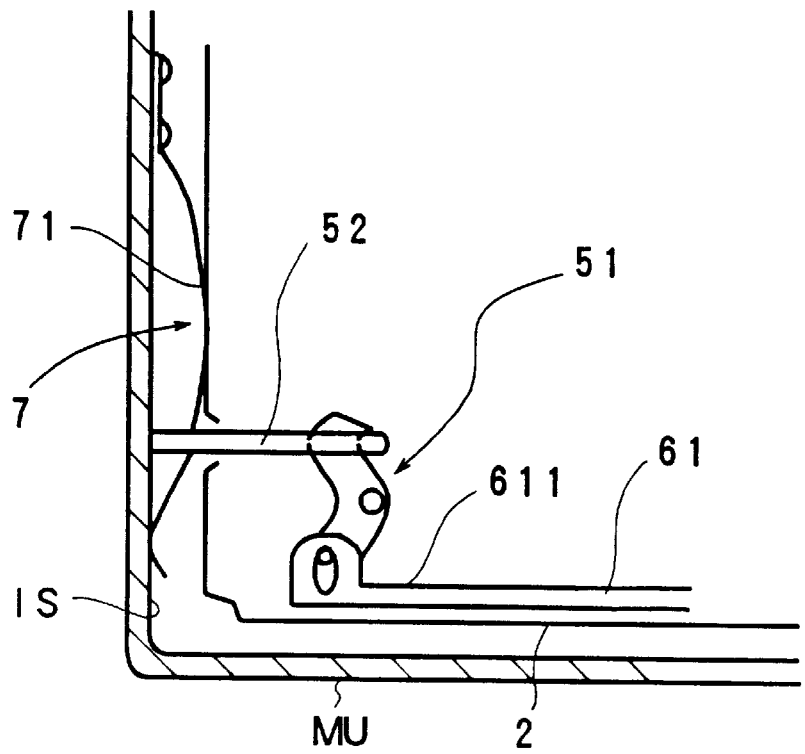
Figure 23:
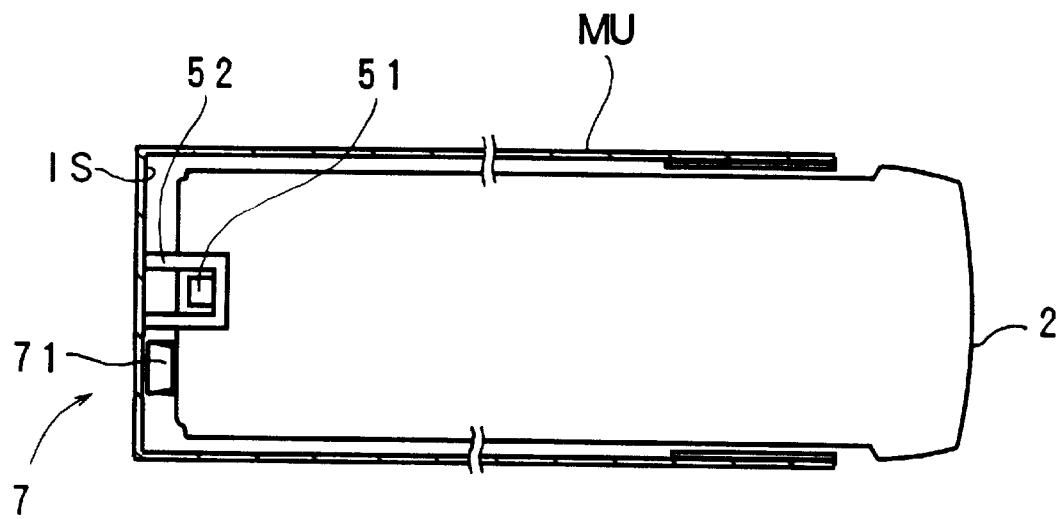
FIGS. 23a and 23b are a side sectional view and rear sectional view showing the holding state of the elastic holding mechanism of the apparatus of the fourth preferred embodiment.
Figure 23:
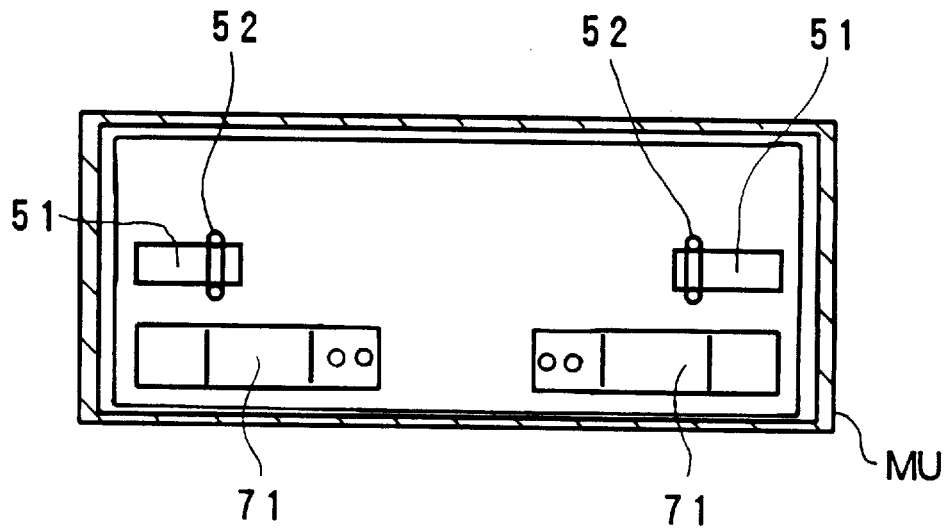
Figure 24:
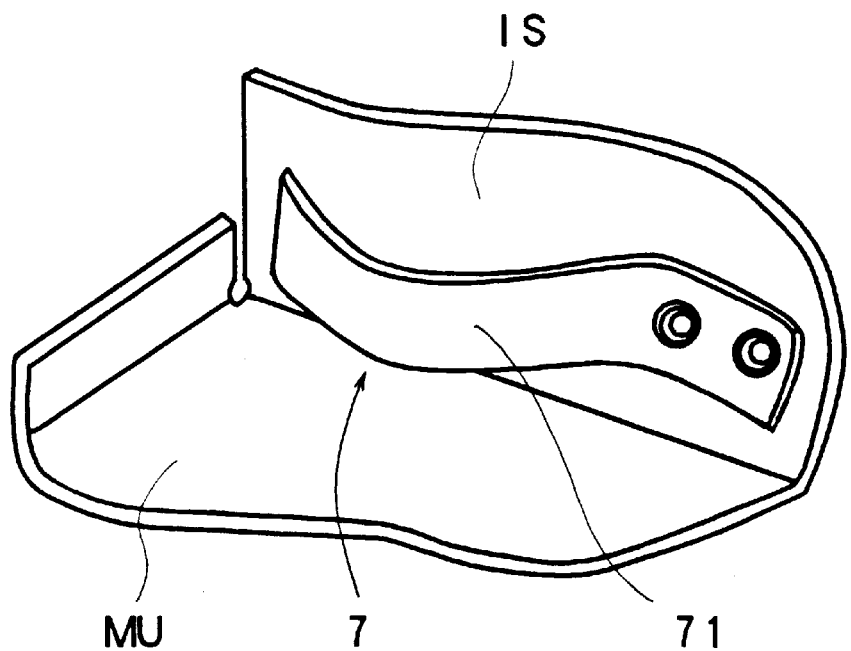
FIG. 24 is a partial perspective view showing the free state of the elastic holding mechanism of the apparatus of the fourth preferred embodiment.

As shown in FIG. 22–FIG. 24, the elastic holding mechanism 7 includes arcuate plate spring members 71, which are disposed on the right and left body-side side wall portions facing the rear portion (the front portion in the traveling direction of the vehicle) of the detachable unit 2. When the first and second engagement members are engaged with each other so as to lock the detachable unit to the vehicle body, the rear portion of the detachable unit 2 presses the plate spring members 71, thereby causing elastic deformation. As a result, the detachable unit 2 is elastically held by the elastic force due to the elastic deformation of the spring members 71.

As shown in FIG. 22–FIG. 24, the plate spring members 71 are strip-like plate members, and have an arcuate cross section. One end of each plate spring member 71 is connected to the central portion of the inner wall IS of the mounting unit MU at the vehicle body side so at to obtain a cantilever structure. As shown in FIG. 23 (B), one of the plate spring members 71 is disposed on the left side and the other of the plate spring members 71 is disposed on the right side. When the carryable unit constituting the detachable unit 2 is inserted into the mounting unit MU within the console of the vehicle and is then locked, the plate spring members 71 contact both sides of the rear portion of the carryable unit so as to elastically press and hold the carryable unit.

The spring constant of the plate spring members 71 is determined such that the plate spring members 71 can elastically hold the carryable unit 2 in the locked state. However, the spring constant may be set such that the carryable unit 2 slightly moves for projection due to the biasing force when the levers 64 are swung to the horizontal unlock position, as shown in FIG. 19, or such that the carryable unit 2 does not move in such a state.

Figure 25:
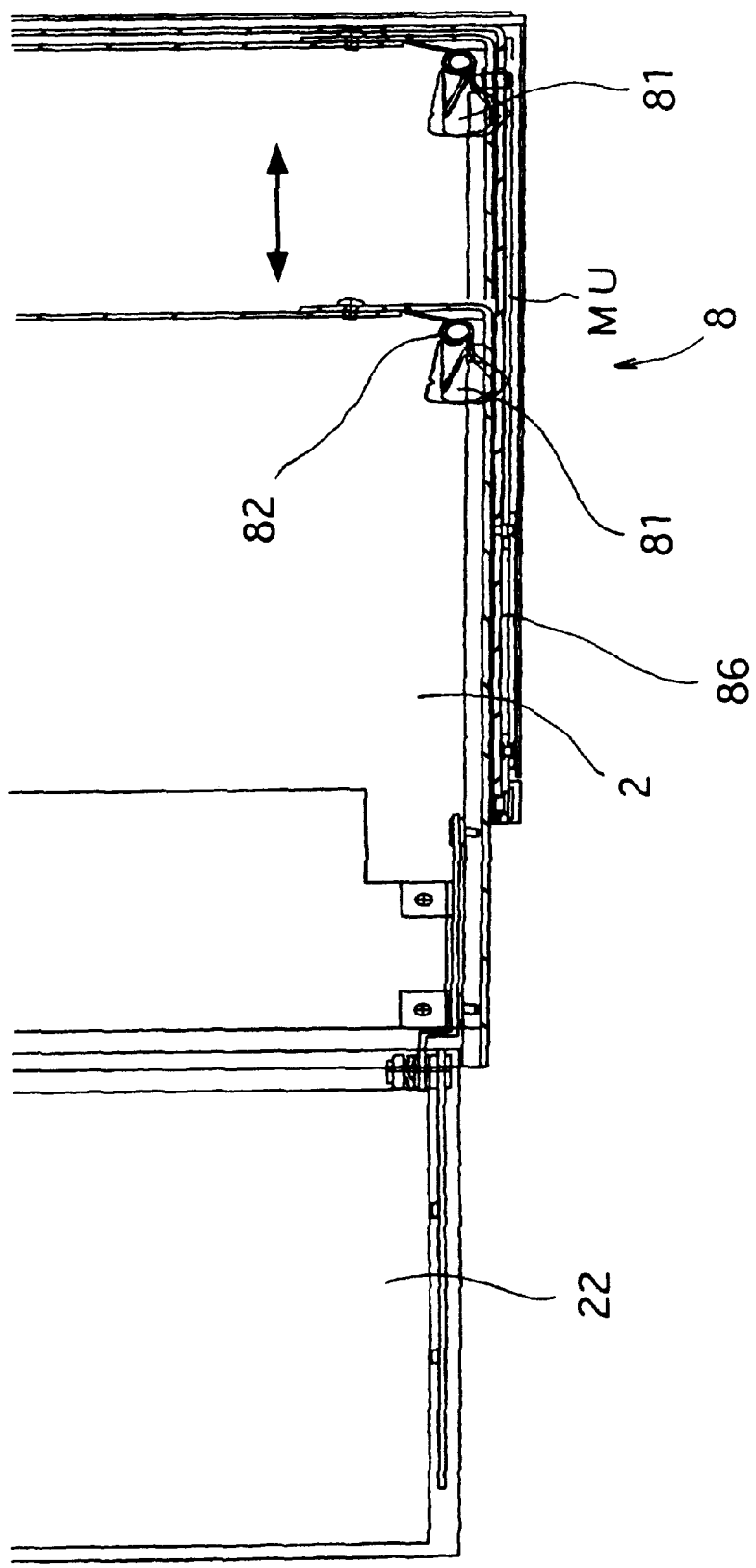
FIG. 25 is a partial plan sectional view showing two positioned states of the display positioning mechanism of the apparatus of the fourth preferred embodiment.
Figure 26:
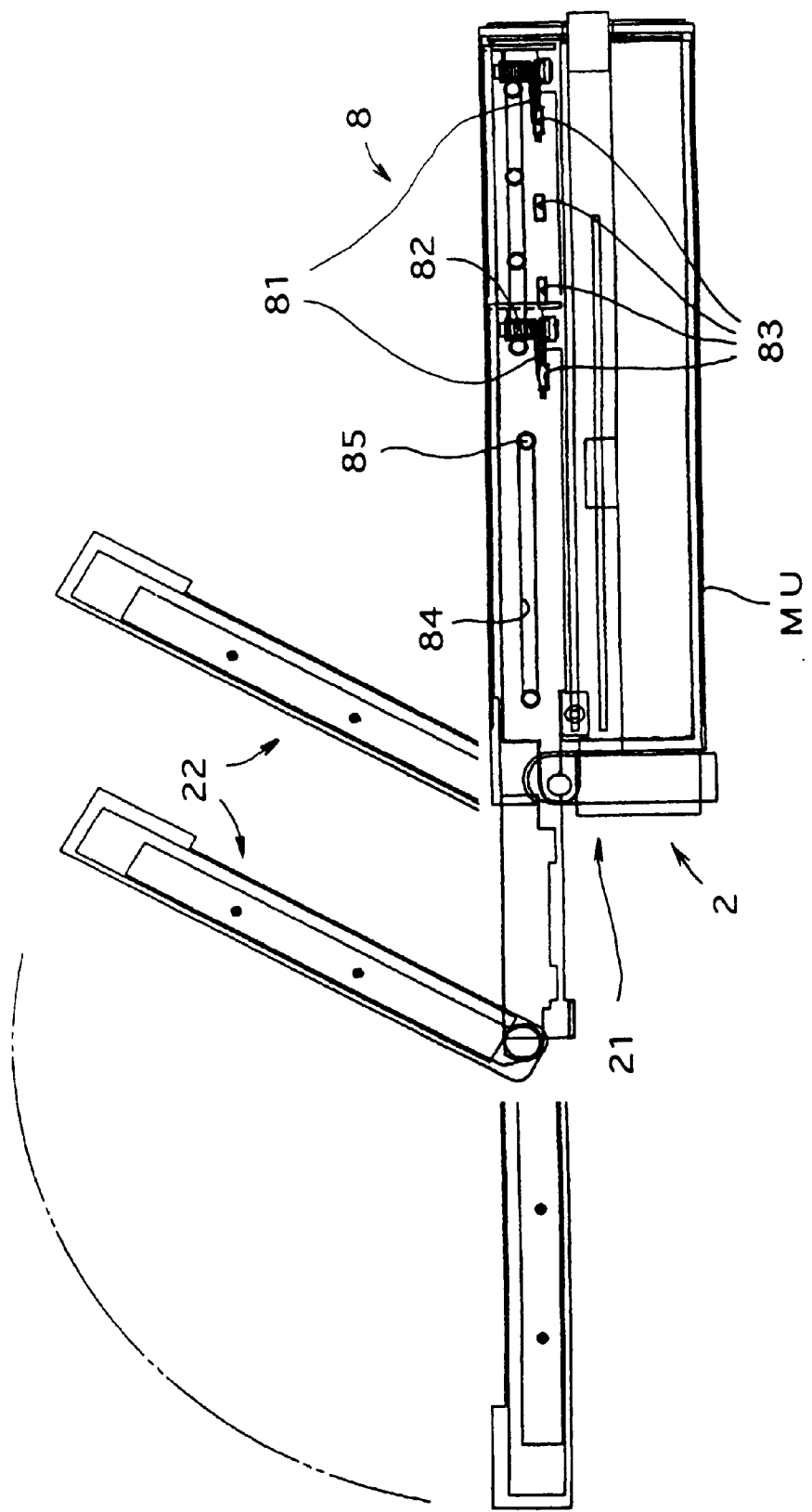
FIG. 26 is a side sectional view showing two positioned states of the display positioning mechanism of the apparatus of the fourth preferred embodiment.

As shown in FIG. 25 and FIG. 26, the display positioning mechanism 8 includes engagement members 81 each of which is disposed on a side wall of the display unit 22 within the detachable unit 2, in which the display unit 22 is allowed to project by the sliding movement of a slot pin 85 within a slot 84. Each engagement member 81 is biased by a spring 82 to swing. A plurality of engagement portions 83 are formed on a portion facing the side wall of the display unit 22. That is, the plurality of engagement portions 83 are formed on the inner wall of the intermediate frame 86 disposed within the mounting unit MU of the unit space within the console of the vehicle such that the engagement portions 83 are arranged in the direction of movement of the display unit 22. The display unit 22 can take any one of a plurality of projected positions by changing the relationship of engagement between the engagement member 81 and the plurality of engagement portions 83.

The engagement member 81 is formed of a plate member having a generally triangular shape, and is disposed on each of the right and left side walls of the detachable unit 2, and is biased outward by the spring member formed of a coil spring. Four rectangular openings serving as the engagement portions 83 are formed in each inner side wall of the mounting unit MU of the console of the vehicle. The position of the display unit 22 can be arbitrarily set by changing the rectangular engagement portion 83 formed in the intermediate frame 86 with which the tip portion of the engagement member 81 engages, as shown in FIG. 26.

In the navigation apparatus for vehicles of the fourth preferred embodiment having the structure shown in FIG. 15 and FIG. 16, when the carryable unit serving as the detachable unit 2 is installed into the unit space within the console of the vehicle, the male connector element (one connector element) 31 of the connector 3, which is disposed at the rear end of the MMECU board 310 disposed on the rear portion of the carryable unit, is inserted into and is connected with the female connector element 32, which is disposed on the vehicle body-side portion facing the rear portion of the carryable unit 2, i.e., on the connector board 320 disposed on the inner wall IS of the mounting unit within the console of the vehicle. As a result, the plurality of terminals each having a constant length and formed in the connector elements 31 and 32 of the connector 3 are connected with each other, wherein the terminals are provided for 5 V power supply, 8 V power supply, signal lines and a ground line, and are connected to the power supply unit 33 having a power supply circuit consisting of a plurality of voltage drop circuits. By the connection of the terminals, the power supply voltages are supplied to the CD unit 21, the liquid crystal display 22 functioning as the display unit, and the MMECU 20, while signals are exchanged.

As shown in FIG. 16 and FIG. 17, when the lever 64 is swung from the vertical position to the horizontal position, the rod 61 and the contact member 41 formed at one end of the rod 611 moves in such a direction (rightward direction) that the contact member 41 separates from the detection switch portion 40. As a result, before the respective terminals of the connector elements 31 and 32 of the connector 3 separate from each other due to the biasing force of the plate spring members 71, the stroke member 401 of the detection switch portion 40 on the vehicle body-side portion moves, so that the stroke member 401 separates from the contact member 41 provided on the rod 61 within the carryable unit 2. With this operation, the detection switch 4 is turned off, so that the on/off circuit 321 for the backup power supply and a switch circuit 333 of the voltage drop circuits (for 8 V and 5 V), both connected to the detection switch portion 40, are turned off.

When the carryable unit constituting the detachable unit 2 is installed into the unit space within the console of the vehicle, as shown in FIG. 18–FIG. 21, the lock mechanism 5 operates. The bent portions 511 formed at the first ends of the first engagement members 51, each of which is formed by a member having a generally S-like shape and swingable about a pin inserted into the central portion thereof, are engaged with the forward end vertical portions 521 of the generally U-shaped second engagement members 52 which are disposed at the right and left positions of the vehicle body-side portion.

Figure 20:
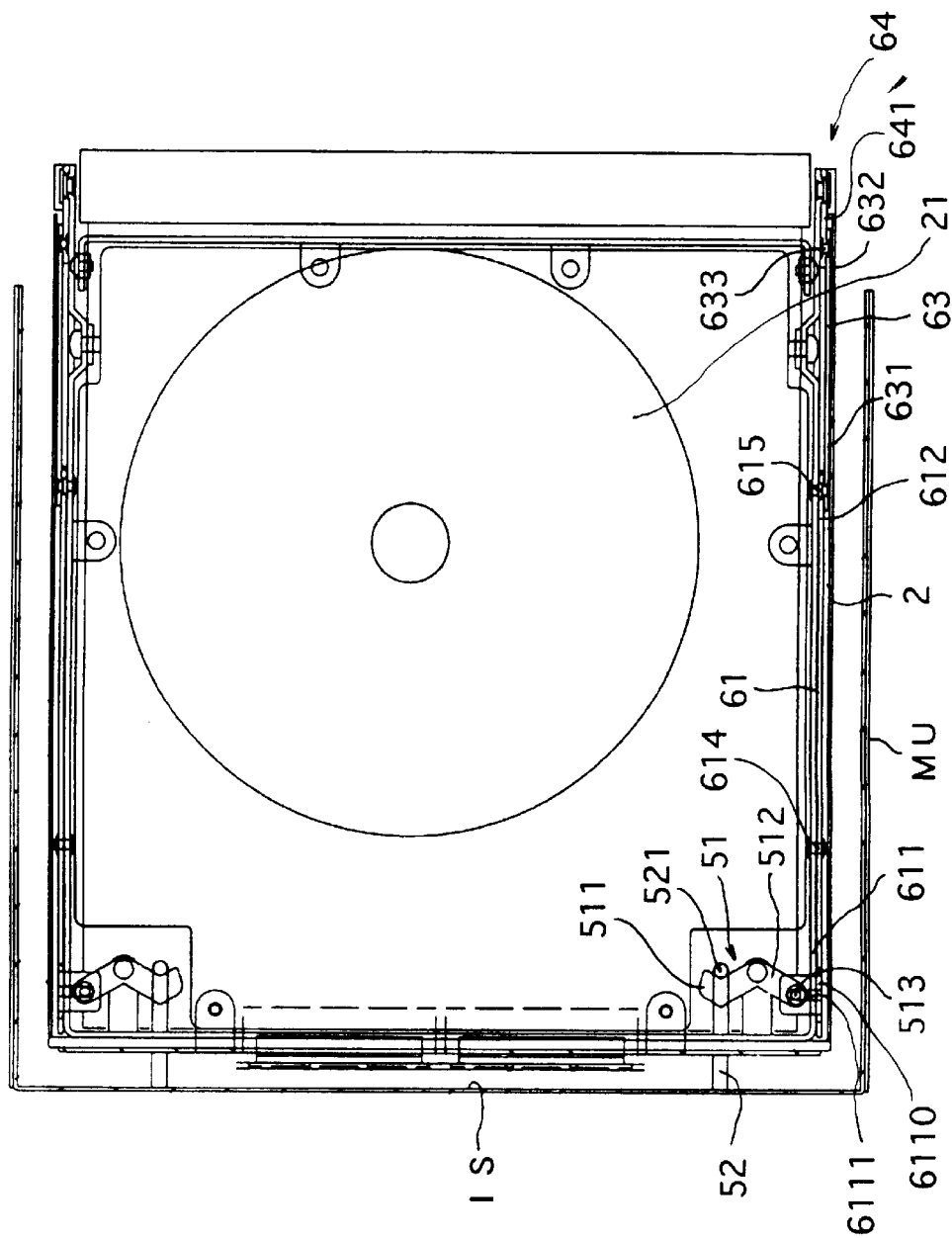
FIG. 20 is a plan sectional view showing a locked state of the lock mechanism and the unlock mechanism of the apparatus of the fourth preferred embodiment.
Figure 21:
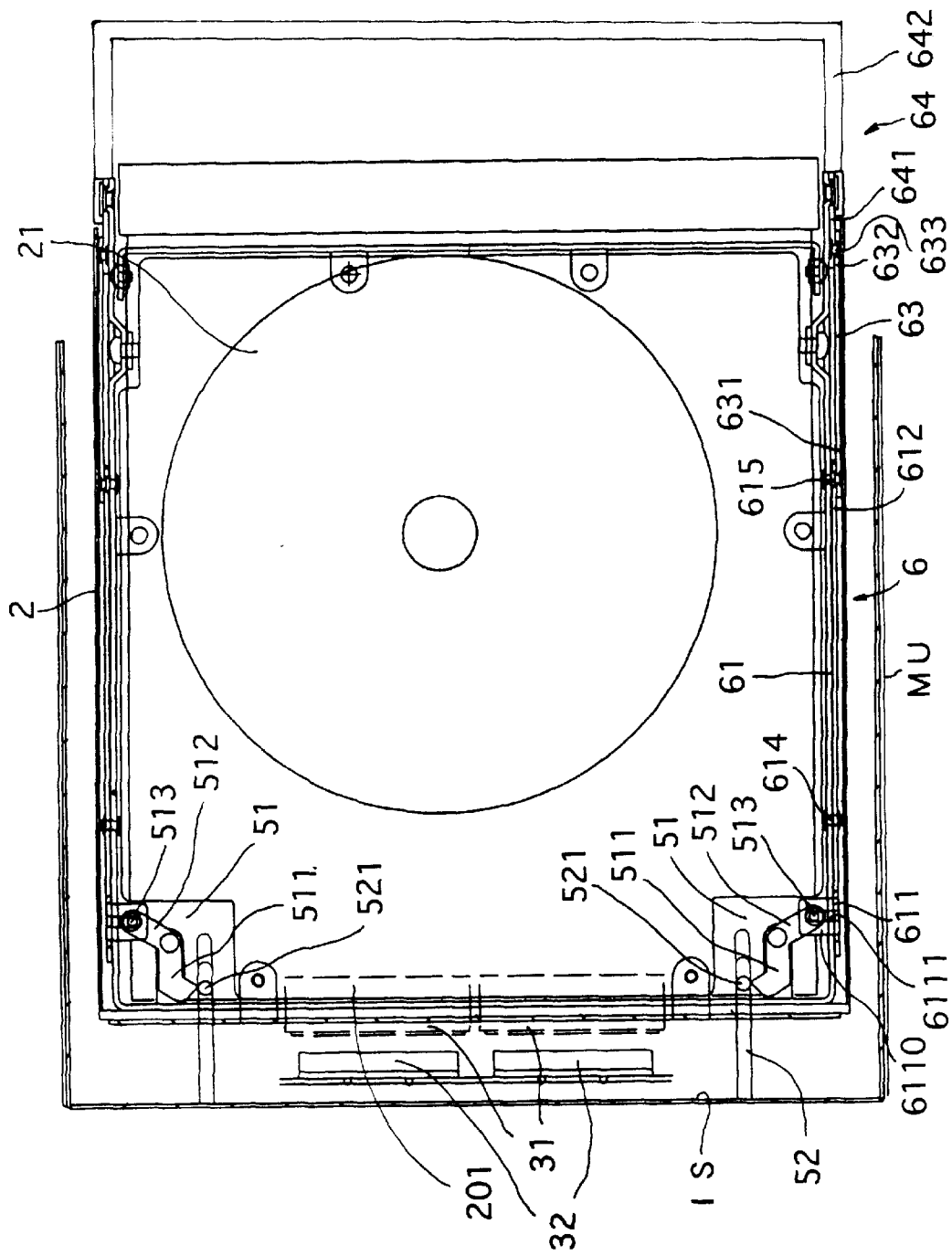
FIG. 21 is a plan sectional view showing an unlocked state of the lock mechanism and the unlock mechanism of the apparatus of the fourth preferred embodiment.

In the unlock mechanism 6, when the levers 64 are swung in the counterclockwise direction about the fulcrums 643 at the corner portions from the vertical position shown in FIG. 18 to the horizontal position shown in FIG. 19, the links 63 swing in the clockwise direction about the first ends 631 thereof while the rods 61 move rightward in FIG. 18 and FIG. 20, so that the contact member 41 is moved rightward so as to turn off the detection switch 4. In addition, since the first engagement members 51 swing in the counterclockwise direction, the relationship of engagement between the first and second engagement members 51 and 52 is changed from the state shown in FIG. 20 to the state shown in FIG. 21 so as to break the engagement therebetween. With this operation, the locked state of the detachable unit 2 is broken, and the detachable unit 2 is slightly projected by the biasing force of the plate spring members 71 so as to easily remove the installed detachable unit 2.

When the carryable unit constituting the detachable unit 2 is installed into the unit space within the console of the vehicle and is locked by the lock mechanism 5, as shown in FIG. 22–FIG. 24, the elastic holding mechanism 7 operates. The rear portion of the detachable unit 2 presses the arcuate plate spring members 71 having a cantilever structure, thereby causing elastic deformation of the spring members 71, so that the detachable unit 2 is elastically held by the elastic force produced due to the elastic deformation of the spring members 71.

When the display unit 22 is pulled out of the console of the vehicle, as shown in FIG. 25 and FIG. 26, the display positioning mechanism 8 operates. The engagement members 81, which are disposed on the side walls of the detachable unit 2 and biased by the springs 82 for swing movement, are engaged with any ones of the engagement portions 83 formed on the inner walls of the console of the vehicle, so that the display unit 22 is positioned at any one of setting positions, as shown in FIG. 26.

In the navigation apparatus for vehicles according to the fourth preferred embodiment providing the above-described action, when the carryable unit 2 is installed into the unit space within the console of the vehicle, one connector element 31 of the connector 3, which is disposed on the rear portion of the carryable unit 2 and is connected to the CD unit 21, the display unit 22 and the MMECU 20, is connected to the other connector element 32 of the connector 3 which is disposed on the vehicle body-side portion. Accordingly, there is provided the effect of making it possible to supply electrical power to the carryable unit 2 and to input and output signals to and from the carryable unit 2.

In the navigation apparatus for vehicles according to the fourth preferred embodiment, the levers 64 of the unlock mechanism 6 are swung from the vertical lock position to the horizontal unlock position, and the rod 61 and the contact member 41 formed at one end of the rod 611 move in such a direction (rightward direction) that the contact member 41 separates from the detection switch portion 40. As a result, before the respective terminals of the connector elements 31 and 32 of the connector 3 separate from each other by the biasing force of the plate spring members 71, the contact member 41 separates from the movable stroke member 401, and the detection switch 4 is therefore turned off. Accordingly, there is provided the effect of preventing the carryable unit 2 from being attached and detached in a state in which the backup power supply 332 is on.

On the contrary, in the locked state of the carryable unit 2 in which the levers 64 are set to the vertical position, the detection switch 4 is maintained on. Accordingly the lever 64 attains the on-off operation as the power switch on the carryable unit 2, and it is unnecessary to provide an independent power switch on the carryable unit 2 and to check an on-off state of the power switch.

When the levers 64 of the unlock mechanism 6 are swung to the horizontal position in a state in which the engine switch (not shown) is on, the stroke member 401 of the detection switch portion 40 of the detection switch 4, which is disposed on the vehicle body-side portion within the console, and the contact member 41, which is disposed on the rear portion of the carryable unit 2, separate from each other so as to turn off the switch 333 disposed between the voltage drop circuit 331 of the power supply circuit 33 and the battery. This turning off of the switch 33 is performed before the connector elements 31 and 32 separate from each other in a state in which current is supplied from the voltage drop circuit 331 of the power supply circuit 33 to the motors (8 V) and the IC boards (4 V) of the CD unit 21 via the connector elements 31 and 32. Accordingly, it is possible to avoid problems which would otherwise occur due to separation of the connector 3 in a state in which current flows.

In the case where a foreign matter such as a hairpin, or a clip enters, by mistake, into the concaved portion of the female connector element (the other connector element) 32 disposed on the vehicle body side in a state in which the carryable unit 2 is pulled out of the mounting unit MU of the unit space within the console of the vehicle, and the carryable unit 2 therefore is not locked, the stroke member 401 of the detection switch portion 40 projects and is in the off state, as is apparent from FIG. 16. Therefore, the on/off circuit 321 of the backup power supply 332 and the switch 333 are turned off, so that the formation of a short circuit between the terminals due to the foreign matter can be avoided.

In the navigation apparatus for vehicles of the fourth preferred embodiment, when the carryable unit 2 is installed into the mounting unit MU within the console of the vehicle, one engagement member 511 of the engagement mechanism 5, which is disposed on the rear portion of the carryable unit 2, is engaged with the other engagement member 52, which is disposed on the inner wall IS of the mounting unit MU of the body-side. Since the rods 61 are biased by the springs 62, the carryable unit 2 for locked to the vehicle body. Therefore, there is provided the effect of preventing the carryable unit 2 from coming out of the console of the vehicle.

In the navigation apparatus for vehicles of the fourth preferred embodiment, when the levers 64 of the unlock mechanism 6 are swung about the fulcrums 643, the links 63 swing and the rods 61 move, whereby controlling the relationship of engagement between the first engagement members 51, to which the first ends 611 of the rods 61 are connected and which are disposed on the rear portion of the carryable unit 2, and the second engagement members 52, which are disposed on the inner wall IS of the mounting unit MU of the body-side, thereby breaking the locked state of the carryable unit 2. Accordingly, there is provided the effect of making it possible to remove the carryable unit 2 from the console of the vehicle and use it outdoors or in a room.

Figure 27:
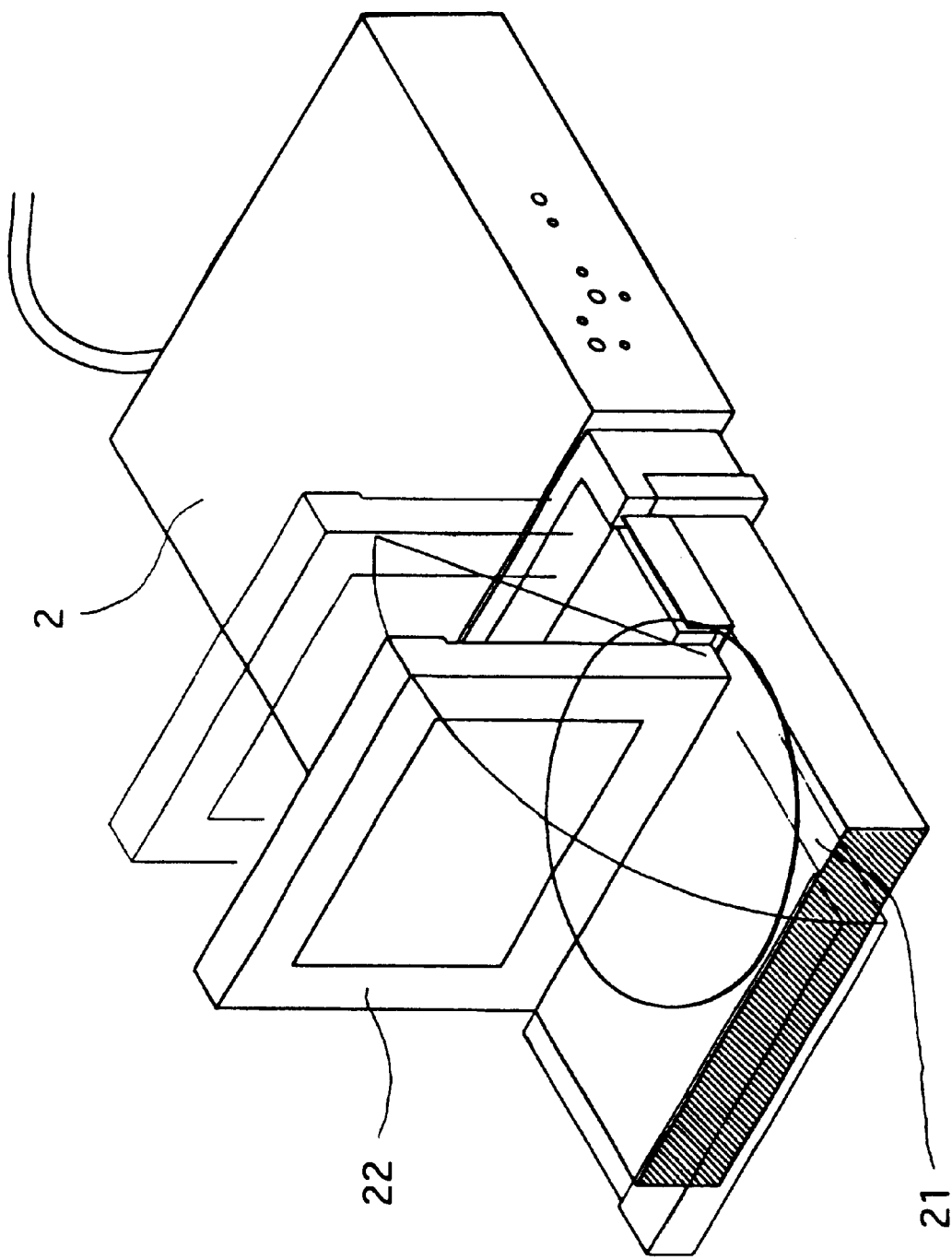
FIG. 27 is a perspective view showing a usable state in which the apparatus of the fourth preferred embodiment is laid horizontal and the levers is set vertical.
Figure 28:
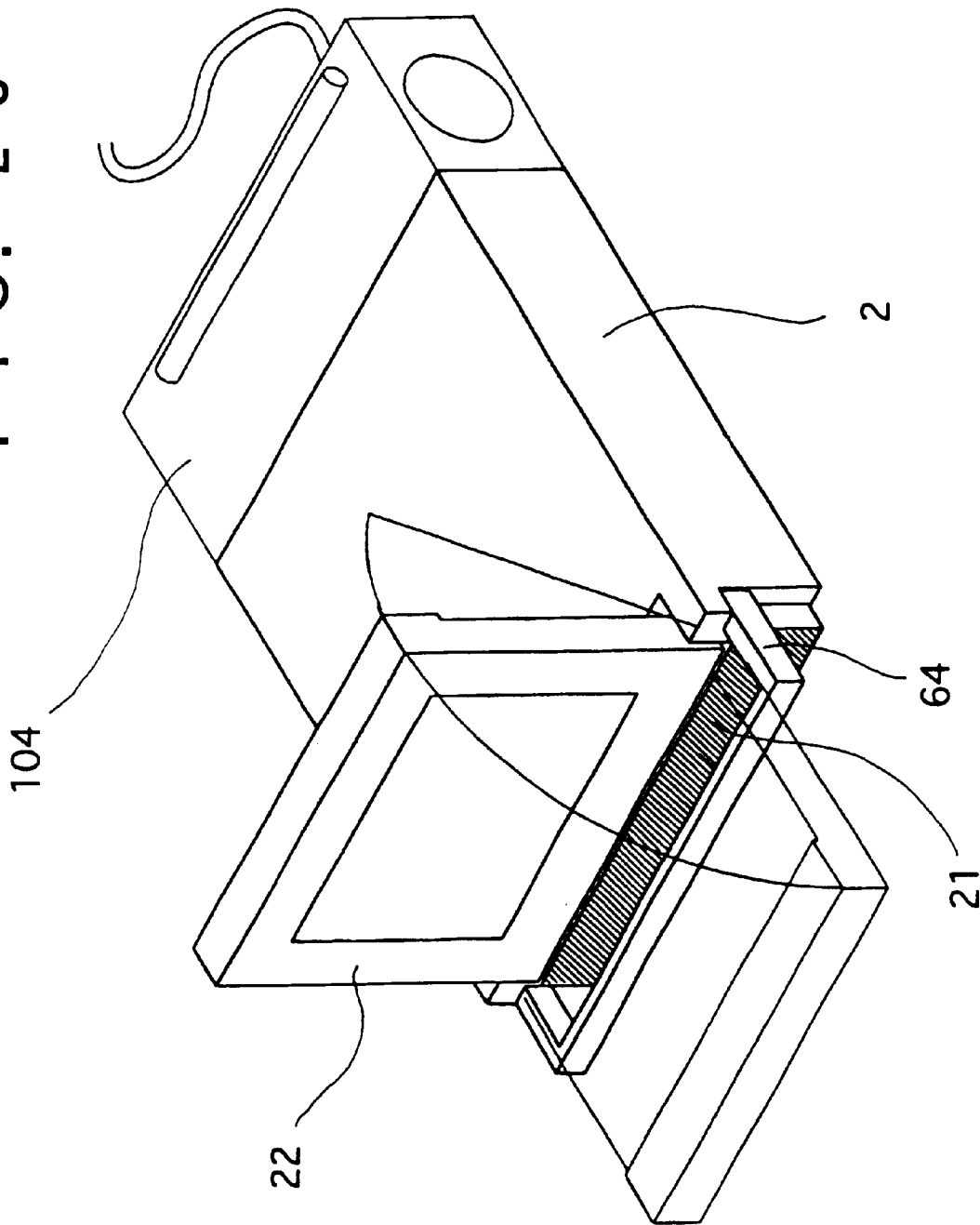
FIG. 28 is a perspective view showing a state after an adapter has been attached in a state in which the lever of the apparatus of the fourth preferred embodiment is set horizontal but before the lever is set vertical.
Figure 30:
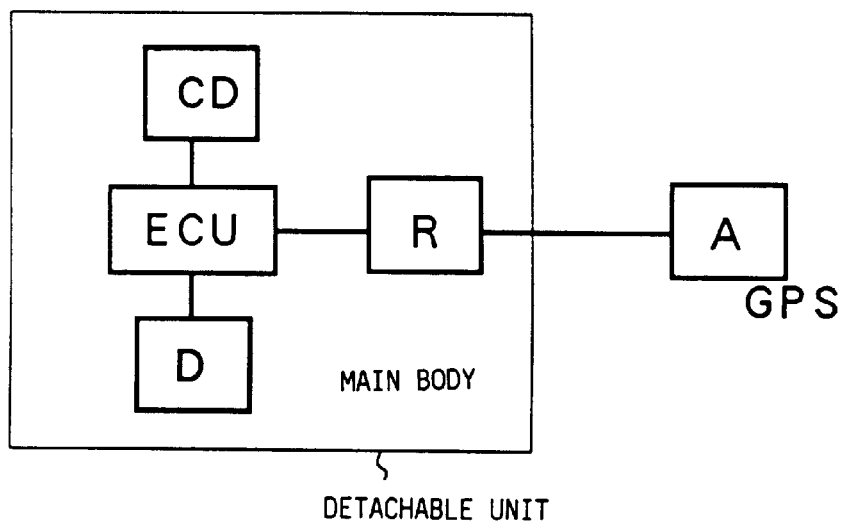
FIG. 30 is a block diagram showing a first conventional apparatus.
Figure 31:
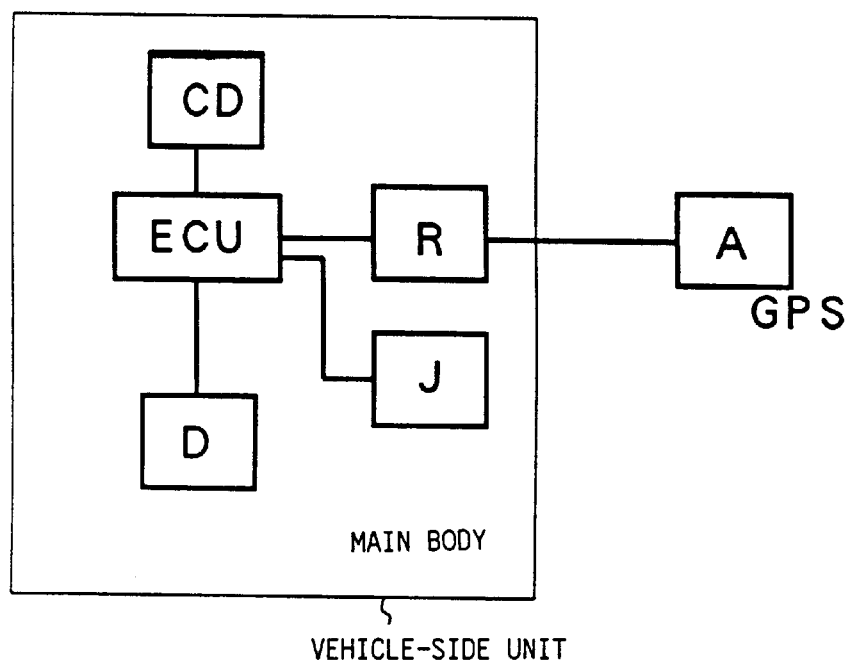
FIG. 31 is a block diagram showing a second conventional apparatus.
Figure 32:
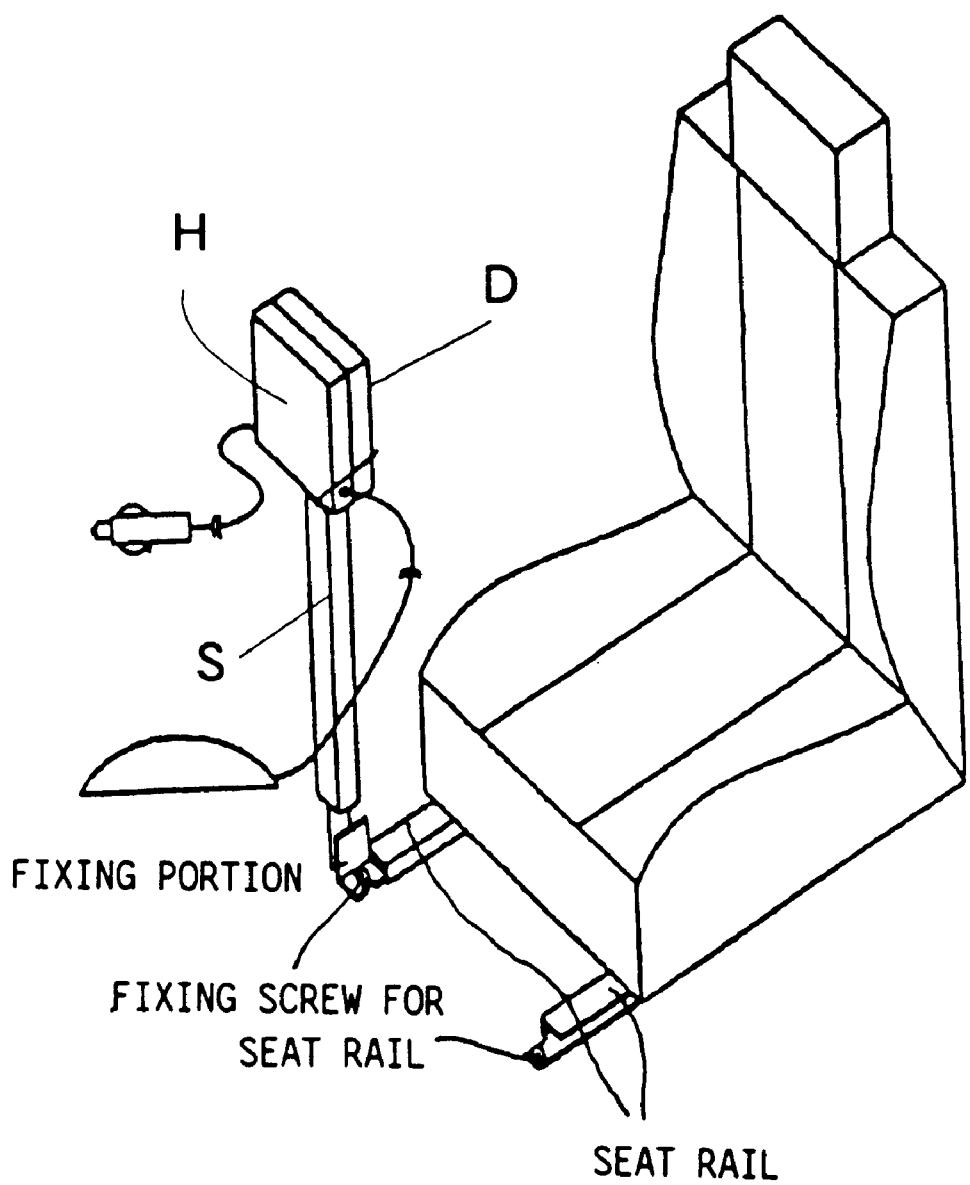
FIG. 32 is a perspective view showing a third conventional apparatus.

As show in FIG. 18 and FIG. 27, the navigation apparatus for vehicles of the fourth preferred embodiment is designed to use the CD unit 21, the LCD panel 22, etc., in a state in which the carryable unit 2 is maintained horizontal and the levers 64 are maintained vertical. Accordingly, when the adapter used in the first preferred embodiment is attached, as shown in FIG. 28, the generally U-shaped engagement members, which are disposed on the mounting unit, may be disposed on the adapter. In this case, it is possible to prevent the adapter from being attached when the levers 64 are positioned at the horizontal position, as shown in FIG. 19 and FIG. 20, and to prevent the CD unit 21 and the like from being used in a state in which the apparatus is maintained vertical, such as a state in which a user is walking while holding the levers.

In the navigation apparatus for vehicles according to the fourth preferred embodiment, when the first and second engagement members 51 and 52 are caused to engage with each other so as to lock the carryable unit 2 to the mounting unit MU, the rear portion of the carryable unit 2 presses the plate spring members 71 of the elastic holding mechanism 7 which are disposed on the body-side sidewall portion, so that the plate spring members 71 are elastically deformed so as to elastically hold the carryable unit 2. Accordingly, there is provided the effect of preventing the carryable unit 2 from rattling which would otherwise occur due to vibration of the vehicle. This prolongs the service life of the display unit 22 and the CD unit within the carryable unit 2 and prevents the generation of noise.

In a conventional apparatus in which a spring member is interposed under the carryable unit 2, the height of the mounting unit increases by an amount corresponding to the thickness of the spring member, which goes against the reduction of the size. In addition, since the spring member dies due to the weight of the carryable unit itself, the elastic holding function cannot be maintained for a prolonged period of time. In contrast, in the fourth preferred embodiment, since the height does not increase, the carryable unit can be inserted into the mounting unit of the unit space within the console. In addition, since the spring member does not die due to the weight of the carryable unit 2, the elastic holding function can be maintained for a prolonged period of time.

In the navigation apparatus for vehicles according to the fourth preferred embodiment, the engagement members 81 are disposed on the side walls of the display unit 22 and are biased to swing by the springs 82 of the display positioning mechanism 8, and the plurality of engagement portions 22 are arranged on the inner side walls of the console of the vehicle facing the side walls of the display unit 22 in the direction of movement of the display unit 22. Accordingly, there is the effect of making it possible to project the display unit 22 along the slots 84 and position the display unit 22 at a desired position among the plurality of projected positions by changing the relationship of engagement between the engagement member 81 and the plurality of engagement portions 83 of the display positioning mechanism 8.

Further, since the projected position of the display unit 22 can be changed by the display positioning mechanism 8, the display unit 22 can be positioned at an optimal position in accordance with the three-dimensional shape of the surface of the console, which changes depending on the manufacture of a vehicle and the kind of the vehicle, and in accordance with the driving position and the desire of a driver.

The above-described preferred embodiments are explanatory examples, and the present invention is not limited thereto. They may be modified or incorporate additional features insofar as they do not go against the technical idea of the present invention which a person with ordinary skill in the art can appreciate from the claims, the detailed description of the present invention, and the drawings.

In the fourth preferred embodiment, a navigation apparatus for vehicles having many mechanisms was described so as to show the best mode. However, the present invention is not limited thereto, and it is possible to employ a structure in which the above-described mechanisms are selectively combined in accordance with the necessity, and costs.

Figure 29:
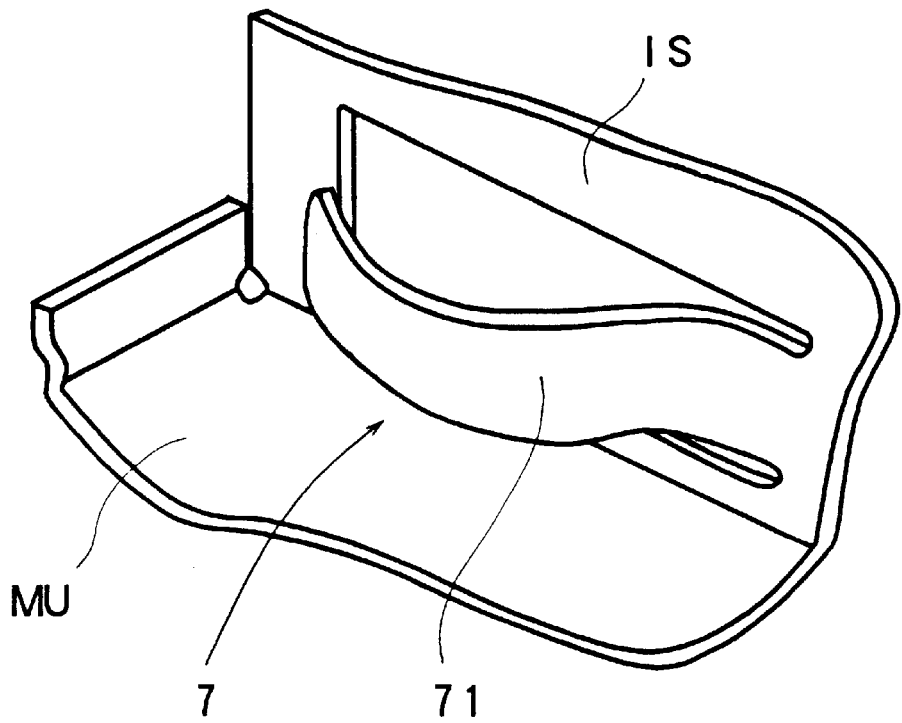
FIG. 29 is a partial perspective view showing the free state of a modification of the elastic holding mechanism of the apparatus of the fourth preferred embodiment.

In the fourth preferred embodiment, a description was given of the example in which the plate spring members are fixed to the central portion of the inner wall of the mounting unit. However, the present invention is not limited thereto. As shown in FIG. 29, the inner wall of a mounting unit made of a spring material is cut away to form a rectangular portion, and the rectangular portion is formed into an arcuate shape, thereby obtaining a plate spring member having a cantilever structure.

In the fourth preferred embodiment, the first preferred embodiment is used as the premise for purposes of convenience. However, the present invention is not limited thereto, and it is possible to employ a structure in which the above-described various mechanisms in the fourth preferred embodiment are properly combined with various preferred embodiments other than the first preferred embodiment.

In the fourth preferred embodiment, an example was described in which the contact member 41 of the detection switch 4 is disposed on the rod 61 of the unlock mechanism 6, and the detection switch 4 is turned on and off in response to the swing movement of the levers 64. However, the present invention is not limited thereto, and it is possible to employ a structure in which the contact member 41 is disposed on a stationary portion of the detachable unit 2 and the detection switch is turned on and off depending on the position of the detachable unit.

What we claim is:

1. A navigation apparatus for vehicles comprising: a vehicle side unit fixed to said vehicle including: a GPS receiver connected to a GPS antenna, a gyro sensor, a vehicle signal processing circuit for processing vehicle signals, a detachable unit including: a CD unit for driving a CD-ROM containing map information, a display unit for displaying a map, and a controller for controlling the entire operation, wherein the detachable unit can be detachably installed in said vehicle so as to electrically connect to the vehicle side unit;

wherein said detachable unit is installed into a unit space within a console of said vehicle;

and wherein said display unit is disposed in said detachable unit such that said display unit is allowed to project from said detachable unit and said projected display unit is swung such that a display portion thereof located on a front face faces a driver.

2. A navigation apparatus for vehicles according to claim 1, further comprising a power supply circuit being disposed within said detachable unit.

3. A navigation apparatus for vehicles according to claim 1, wherein said CD unit is disposed in said detachable unit such that said CD unit is allowed to project from said detachable unit.

4. A navigation apparatus for vehicles according to claim 1, further comprising:

an auxiliary unit comprising at least one of a battery, an AC 100 V connector and a cigarette lighter connector, and at least one of an amplifier and a speaker, so as to enable use of the detachable unit outside said vehicle.

5. A navigation apparatus for vehicles according to claim 2, further comprising:

an auxiliary unit comprising an amplifier, a speaker, a battery, an AC 100 V connector, and a cigarette lighter connector, so as to enable use of the detachable unit outside said vehicle.

6. A navigation apparatus for vehicles according to claim 1, further comprising:

an auxiliary unit comprising an amplifier, a speaker, a battery, an AC 100 V connector, and a cigarette lighter connector, so as to enable use of the detachable unit outside said vehicle.

7. A navigation apparatus for vehicles according to claim 1, further comprising:

one connector element of a connector being connected to said CD unit, said display unit and said ECU, and being disposed on a rear portion of said detachable unit, and the other connector element of said connector being disposed on a vehicle body-side portion facing said rear portion of said detachable unit, whereby when said detachable unit is installed into a unit space within a console of said vehicle, said connector elements are connected with each other.

8. A navigation apparatus for vehicles according to claim 5, further comprising:

a detection switch comprising a detection switch portion which is disposed on said body-side portion facing said rear portion of said detachable unit, and a contact member which is disposed on said rear portion of said detachable unit at a portion facing said detection switch portion, whereby said detection switch portion and said contact member separate from each other before said connector elements separate from each other, when said detachable unit installed into the unit space within said console of said vehicle is removed therefrom.

9. A navigation apparatus for vehicles according to claim 1, further comprising:

one of engagement members, for engaging said detachable unit with a vehicle body, being disposed on the rear portion of said detachable unit, and the other of said engagement members being disposed on a vehicle body-side portion facing said rear portion of said detachable unit, whereby when said detachable unit is installed into a unit space within a console of the vehicle, said engagement members engage with each other so as to lock said detachable unit to said vehicle body.

10. A navigation apparatus for vehicles according to claim 8, further comprising:

one of engagement members, for engaging said detachable unit with a vehicle body, being disposed on the rear portion of said detachable unit, and the other of said engagement members being disposed on a vehicle body-side portion facing said rear portion of said detachable unit, whereby when said detachable unit is installed into a unit space within a console of the vehicle, said engagement members engage with each other so as to lock said detachable unit to said vehicle body.

11. A navigation apparatus for vehicles according to claim 9, further comprising:

an unlock mechanism for breaking said engagement between said engagement members to lock said detachable unit to the vehicle body by a motion of at least one member so as to unlock said detachable unit.

12. A navigation apparatus for vehicles according to claim 7, further comprising:

an elastic holding mechanism comprising a spring member disposed on the vehicle body-side sidewall portion facing the rear portion of the detachable unit, whereby when said engagement members are caused to engage with each other so as to lock said detachable unit to said vehicle body, said spring member is pressed by said rear portion of said detachable unit and is elastically deformed, so that said detachable unit is elastically held by said spring member.

13. A navigation apparatus for vehicles according to claim 1, further comprising:

a display positioning mechanism comprising an engagement member disposed on a side wall thereof and biased by a spring to swing, and a plurality of engagement portions which are arranged on an inner side wall of said console of the vehicle facing the side wall of said display unit in the direction of movement of said display unit, whereby said display unit is positioned at any one of a plurality of projected positions by changing the relationship of engagement between said engagement member and the plurality of engagement portions.

14. A navigation apparatus for vehicles according to claim 12, further comprising:

a display positioning mechanism comprising
an engagement member disposed on a side wall thereof and biased by a spring to swing, and
a plurality of engagement portions which are arranged on an inner side wall of said console of the vehicle facing the side wall of said display unit in the direction of movement of said display unit,
whereby said display unit is positioned at any one of a plurality of projected positions by changing the relationship of engagement between said engagement member and the plurality of engagement portions.

15. A navigation apparatus for vehicles according to claim 8, further comprising:
a detection switch comprising
a detection switch portion which is disposed on a vehicle body-side portion facing said rear portion of said detachable unit,
and a contact member which is disposed on one end of said rod at the rear portion of said detachable unit, the one end of the rod facing said detection switch portion,
whereby when said lever is swung to an unlock position, said rod is moved so as to separate said detection switch portion and said contact member.

16. A navigation apparatus for vehicles according to claim 14, further comprising:
a detection switch comprising
a detection switch portion which is disposed on a vehicle body-side portion facing said rear portion of said detachable unit,
and a contact member which is disposed on one end of a rod at the rear portion of said detachable unit, the one end of the rod facing said detection switch portion,
whereby when a lever is swung to an unlock position, said rod is moved so as to separate said detection switch portion and said contact member.

17. A navigation apparatus for vehicles according to claim 11, wherein the unlock mechanism comprising:
a rod whose one end is connected to the one engagement member disposed on said rear portion of said detachable unit and which is biased by a spring,
a link whose one end is swingably connected to the other end of said rod, and
a lever whose one end is connected to the other end of said link and is swingable about a fulcrum,
whereby the engagement between said engagement members which lock said detachable unit to the vehicle body can be broken so as to unlock said detachable unit.

18. A navigation apparatus for vehicles comprising:
a vehicle side unit fixed to a vehicle, and
a detachable unit detachably installed to said vehicle side unit in said vehicle,
wherein said detachable unit is inserted into a unit space thereof so as to automatically connect to said vehicle side unit through connectors;
wherein each unit in said detachable unit is connected to a power supply circuit when said detachable unit is locked to said vehicle by a lock mechanism;
wherein lock states of said mechanism are controlled in response to positions of a lever in said lock mechanism; and
wherein said lock mechanism comprises a reverse link offset from a fulcrum of said lever and biased by a biasing spring so as to attain stable lock states of said lock mechanism.

* * * * *